(12) United States Patent
Watanabe

(10) Patent No.: US 11,934,645 B2
(45) Date of Patent: Mar. 19, 2024

(54) DISPLAY CONTROL DEVICE AND DISPLAY CONTROL METHOD

(71) Applicant: Saturn Licensing LLC, New York, NY (US)

(72) Inventor: Takuo Watanabe, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 100 days.

(21) Appl. No.: 17/615,354

(22) PCT Filed: Jun. 3, 2020

(86) PCT No.: PCT/JP2020/021969
§ 371 (c)(1),
(2) Date: Nov. 30, 2021

(87) PCT Pub. No.: WO2020/250777
PCT Pub. Date: Dec. 17, 2020

(65) Prior Publication Data
US 2022/0229540 A1  Jul. 21, 2022

(30) Foreign Application Priority Data

Jun. 14, 2019 (JP) .................................. 2019-110884

(51) Int. Cl.
*G06F 3/04842* (2022.01)
*G09G 5/14* (2006.01)
(Continued)

(52) U.S. Cl.
CPC ........... *G06F 3/04842* (2013.01); *G09G 5/14* (2013.01); *H04N 21/431* (2013.01); *H04N 21/4316* (2013.01); *H04N 21/472* (2013.01)

(58) Field of Classification Search
None
See application file for complete search history.

(56) References Cited

U.S. PATENT DOCUMENTS 9,992,534 B2 * 6/2018 Campbell ............... H04L 51/10
10,551,995 B1 * 2/2020 Ho ......................... G06F 3/0486
(Continued)

FOREIGN PATENT DOCUMENTS

JP   2007019695 A   1/2007
JP   2013128247 A   6/2013

OTHER PUBLICATIONS

International Search Report for Application No. PCT/JP2020/021969 dated Aug. 4, 2020, 3 Pages.

*Primary Examiner* — Toan H Vu
(74) *Attorney, Agent, or Firm* — Jeffery J. Brosemer

(57) ABSTRACT

The present technology relates to a display control device and a display control method each of which is capable of further improving operability.
Provided is a display control device including a control unit that displays a plurality of items associated with a display screen, and, in a case where a desired item is selected by a user operation from the plurality of displayed items, displays a selected display screen corresponding to the selected item together with the display screen that is currently displayed, the selected display screen being displayed at a position relative to a display position of the selected item. The present technology is applicable to, for example, a television receiver.

17 Claims, 21 Drawing Sheets

(51) Int. Cl.
*H04N 21/431* (2011.01)
*H04N 21/472* (2011.01)

(56) References Cited

U.S. PATENT DOCUMENTS

| | | | |
|---|---|---|---|
| 2008/0222690 A1 | 9/2008 | Kim | |
| 2014/0013356 A1* | 1/2014 | Chen | H04N 21/4384 |
| | | | 725/40 |
| 2014/0089802 A1* | 3/2014 | Wang | H04N 21/482 |
| | | | 715/719 |
| 2015/0193124 A1* | 7/2015 | Schwesinger | G06F 3/04812 |
| | | | 715/863 |
| 2017/0094360 A1* | 3/2017 | Keighran | H04N 21/4668 |
| 2017/0127114 A1* | 5/2017 | Lee | H04N 21/4516 |
| 2017/0249971 A1* | 8/2017 | Chong | G11B 27/036 |
| 2018/0284948 A1* | 10/2018 | Hao | G06F 3/0481 |
| 2018/0335939 A1* | 11/2018 | Karunamuni | G06F 3/0481 |
| 2019/0087202 A1* | 3/2019 | Reddy Koki | G06F 1/3218 |
| 2019/0377459 A1* | 12/2019 | Jeong | G06F 3/0481 |
| 2021/0097901 A1* | 4/2021 | Klein | G06F 3/0481 |

\* cited by examiner

FIG. 13
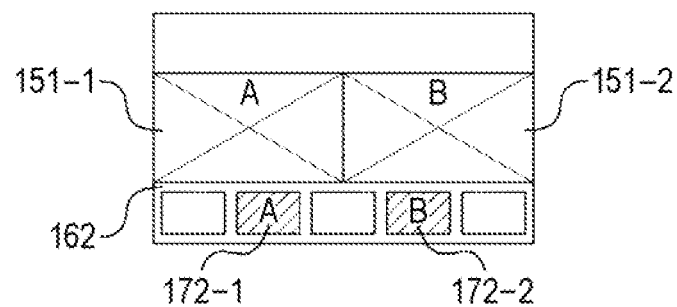
FIG. 14
| FUNCTION | OPERATION METHOD |
|---|---|
| ADD DISPLAY SCREEN | PRESS UP KEY ON ITEM TO BE INCREASED |
| REDUCE DISPLAY SCREEN | PRESS DOWN KEY ON ITEM TO BE REDUCED |
| SWITCH TARGET TO BE OPERATED | FOCUS ON ITEM |
FIG. 15
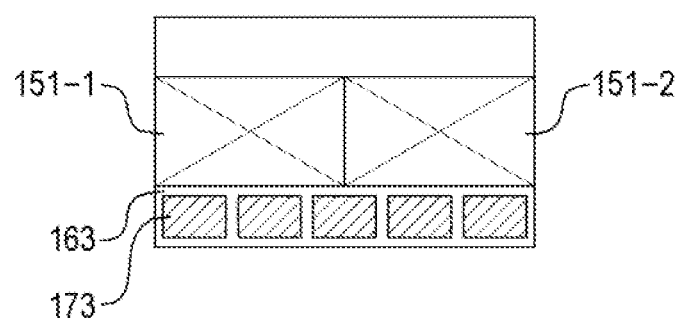

FIG. 16

|   | ITEM LABEL | DESCRIPTION |
|---|---|---|
| 1 | ONE SCREEN: LEFT | TRANSITION TO ONE SCREEN OF LEFT |
| 2 | ONE SCREEN: RIGHT | TRANSITION TO ONE SCREEN OF RIGHT |
| 3 | OPERATE LEFT/OPERATE RIGHT | CHANGE TARGET TO BE OPERATED BETWEEN RIGHT AND LEFT |
| 4 | ENLARGE: ENLARGE LEFT | ENLARGE LEFT, REDUCE RIGHT |
| 5 | ENLARGE: ENLARGE RIGHT | ENLARGE RIGHT, REDUCE LEFT |
| 6 | VOLUME BALANCE: TURN UP LEFT | TURN UP LEFT VOLUME, TURN DOWN RIGHT VOLUME |
| 7 | VOLUME BALANCE: TURN UP RIGHT | TURN UP RIGHT VOLUME, TURN DOWN LEFT VOLUME |
| 8 | CLOSE | CLOSE CONTROL MENU |

DISPLAY CONTROL DEVICE AND DISPLAY CONTROL METHOD

CROSS-REFERENCE TO RELATED APPLICATIONS

This application is a national phase entry under 35 U.S.C. § 371 of International Application No. PCT/JP2020/021969 filed Jun. 3, 2020, which claims the priority from Japanese Patent Application No. 2019-110884 filed in the Japanese Patent Office on Jun. 14, 2019, the entire contents of which are hereby incorporated by reference.

TECHNICAL FIELD

The present technology relates to a display control device and a display control method, and more particularly to a display control device and display control method each of which is capable of further improving operability.

BACKGROUND ART

In recent years, a display control device such as a television receiver can provide various functions as performance thereof increases.

For example, Patent Document 1 discloses a technology of, in a case where an image (object) displayed on a browser screen of a television receiver is selected, displaying an image of a web page corresponding to the selected object together with an image superimposed on the browser screen (see paragraphs 0172 and 0173 and FIG. 14 in particular).

CITATION LIST

Patent Document

Patent Document 1: Japanese Patent Application Laid-Open No. 2013-128247

SUMMARY OF THE INVENTION

Problems to be Solved by the Invention

According to the technology disclosed in Patent Document 1 cited above, however, in a case where a plurality of display screens is displayed, relevance of the selected object to a web page corresponding to the object is not clear, which reduces operability. Therefore, it has been required to improve operability in a case where a plurality of display screens is displayed.

The present technology has been made in view of such a circumstance, and an object thereof is to further improve the operability.

Solutions to Problems

A display control device according to one aspect of the present technology is a display control device including a control unit that displays a plurality of items associated with a display screen, and, in a case where a desired item is selected by a user operation from the plurality of displayed items, displays a selected display screen corresponding to the selected item together with the display screen that is currently displayed, the selected display screen being displayed at a position relative to a display position of the selected item.

A display control method according to one aspect of the present technology is a display control method including causing a display control device to display a plurality of items associated with a display screen, and, in a case where a desired item is selected by a user operation from the plurality of displayed items, display a selected display screen corresponding to the selected item together with the display screen that is currently displayed, the selected display screen being displayed at a position relative to a display position of the selected item.

In the display control device and the display control method according to one aspect of the present technology, a plurality of items associated with a display screen is displayed, and, in a case where a desired item is selected by a user operation from the plurality of displayed items, a selected display screen corresponding to the selected item is displayed together with the display screen that is currently displayed, the selected display screen being displayed at a position relative to a display position of the selected item.

The display control device according to one aspect of the present technology may be an independent device or an internal block forming a single device.

BRIEF DESCRIPTION OF DRAWINGS

FIG. 13 illustrates a first example of a control menu.

FIG. 14 illustrates a first example of functions of a control menu.

FIG. 15 illustrates a second example of a control menu.

FIG. 16 illustrates a second example of functions of a control menu.

MODE FOR CARRYING OUT THE INVENTION

Hereinafter, an embodiment of the present technology will be described with reference to the drawings. Note that description will be provided in the following order.
1. Embodiment of the present technology
2. Modification examples
3. Configuration of computer 1. Embodiment Of The Present Technology (Configuration of Display Control Device)

Figure 1:
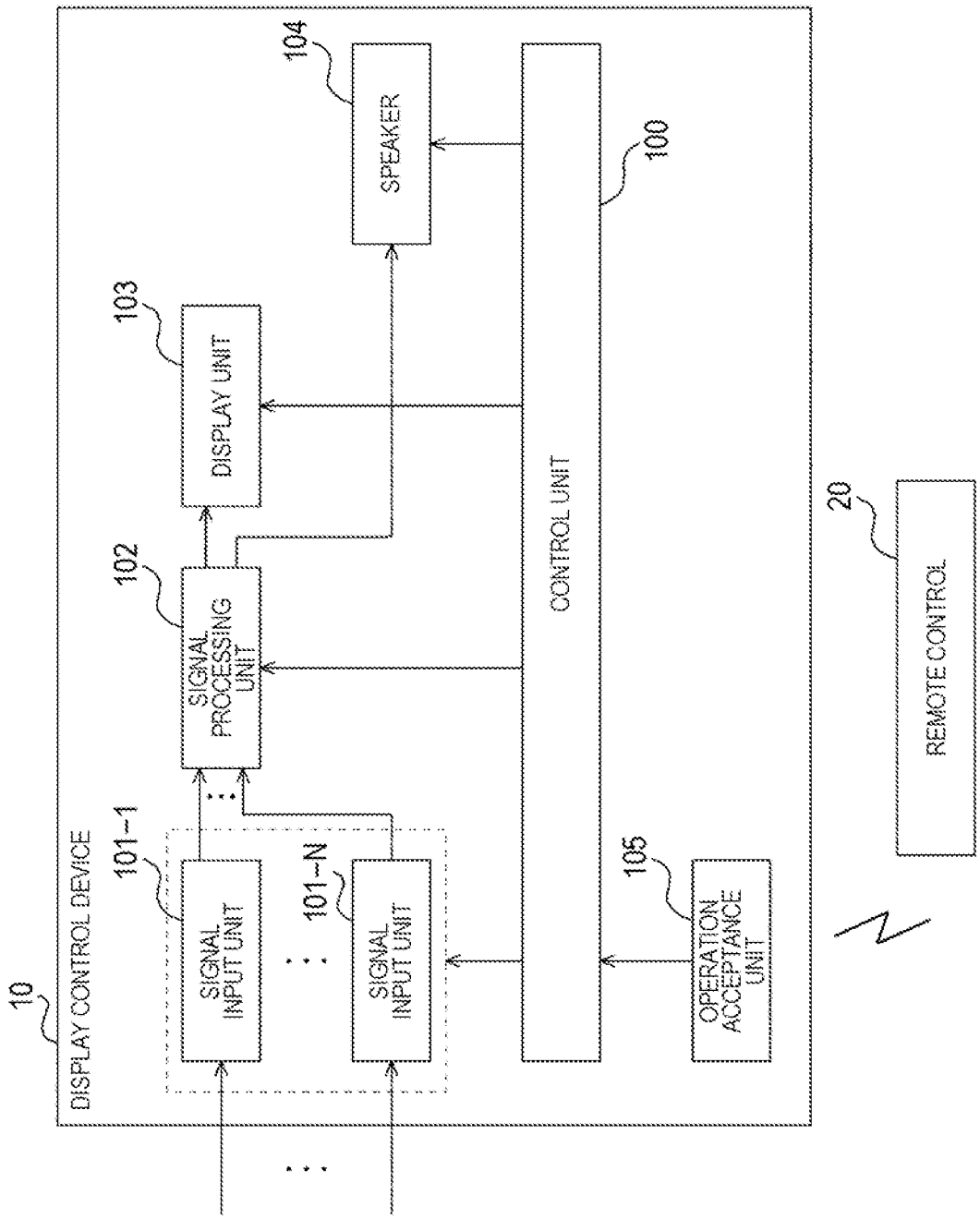
FIG. 1 is a block diagram illustrating a configuration example of an embodiment of a display control device to which the present technology is applied.

FIG. 1 illustrates a configuration example of an embodiment of a display control device to which the present technology is applied.

In FIG. 1, a display control device 10 is, for example, a television receiver that is a liquid crystal display device, an organic light emitting diode (OLED) display device, or the like. The display control device 10 includes a control unit 100, signal input units 101-1 to 101-N (N: an integer of 1 or more), a signal processing unit 102, a display unit 103, a speaker 104, and an operation acceptance unit 105.

The control unit 100 includes, for example, a central processing unit (CPU), a microcomputer, and the like. The control unit 100 is a main control device (processing device) that controls operation of each unit and performs various kinds of arithmetic processing, and controls operation of each unit of the display control device 10.

The signal input unit 101-1 includes, for example, a tuner or the like. In a case where the signal input unit 101-1 is a tuner, the signal input unit 101-1 performs processing such as demodulation processing on a broadcast signal received via an antenna (not illustrated) and supplies a resultant signal to the signal processing unit 102. The broadcast signal herein transmits broadcast content (e.g., a television program) transmitted according to a predetermined broadcasting system such as terrestrial broadcasting, satellite broadcasting, or cable television broadcasting.

Note that the signal input unit 101-1 is not limited to the tuner and may be a communication module or the like, and a signal of communication content provided by a moving image streaming service via a communication network such as the Internet may be input to the signal processing unit 102. Examples of the communication content provided by the moving image streaming service include moving image content provided by an over the top (OTT) service.

Further, the signal input unit 101-1 may be an interface conforming to a predetermined standard such as high definition multimedia interface (HDMI (registered trademark)) or universal serial bus (USB).

For example, in the configuration of FIG. 1, the signal processing unit 102 receives input of signals of recorded video content recorded by a recorder (recorder and player) or network storage, game content reproduced by a game console, recorded content recorded on a recording medium such as a semiconductor memory or optical disk, and other content via the interface conforming to the predetermined standard. Note that the recorded video content may be recorded by a television receiver on a storage.

Each of the signal input units 101-2 to 101-N, as well as the signal input unit 101-1, includes a tuner, a communication module, an interface conforming to a predetermined standard, or the like and supplies various signals to the signal processing unit 102. Note that, in the following description, the signal input units 101-1 to 101-N will be referred to as signal input units 101 unless it is necessary to distinguish the signal input units in particular.

The signal processing unit 102 includes, for example, a system on a chip (SoC) or the like. The signal processing unit 102 performs processing such as decoding on the signal supplied from each signal input unit 101, supplies a resultant image signal to the display unit 103, and supplies a resultant audio signal to the speaker 104.

The display unit 103 includes, for example, a liquid crystal display unit, an OLED display unit, or the like. Under the control of the control unit 100, the display unit 103 processes the image signal supplied from the signal input unit 101 and displays an image of the content such as a television program or moving image, various screens (e.g., a menu screen and the like), and the like.

For example, in a case where the display control device 10 is a liquid crystal display device, the display unit 103 serving as the liquid crystal display unit is a display panel in which pixels including liquid crystal elements and thin film transistor (TFT) elements are two-dimensionally arranged, and is driven by the control unit 100 to modulate light emitted from a backlight (not illustrated), thereby performing display. Meanwhile, for example, in a case where the display control device 10 is an OLED display device, the display unit 103 serving as the OLED display unit is a display panel in which pixels including self-luminous elements are two-dimensionally arranged, and is driven by the control unit 100 to perform display.

Under the control of the control unit 100, the speaker 104 processes the audio signal supplied from the signal input unit 101 and outputs a sound of the content such as a television program or moving image.

The operation acceptance unit 105 includes, for example, a near-field wireless communication module, an infrared light receiver module, and the like. The operation acceptance unit 105 receives a signal (receives light) such as a wireless signal or infrared signal transmitted from a remote control 20, and supplies the received signal to the control unit 100 as an operation signal.

The control unit 100 controls operation of each unit in response to a command corresponding to the operation signal supplied from the operation acceptance unit 105. Note that, as near-field wireless communication, it is possible to perform communication conforming to a standard such as Bluetooth (registered trademark).

(Functional Configuration of Control Unit)

Figure 2:
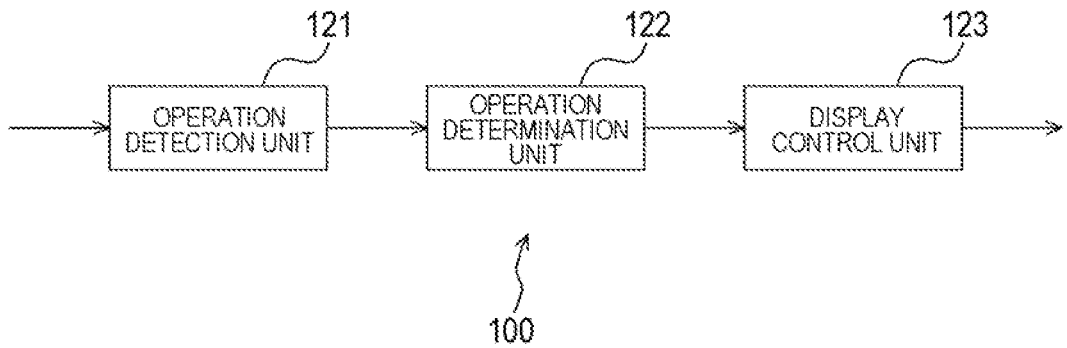
FIG. 2 is a block diagram illustrating an example of a functional configuration of a control unit in FIG. 1.

FIG. 2 illustrates an example of a functional configuration of the control unit 100 in FIG. 1.

In FIG. 2, the control unit 100 includes an operation detection unit 121, an operation determination unit 122, and a display control unit 123.

The operation detection unit 121 detects a user operation on the remote control 20 on the basis of the operation signal supplied from the operation acceptance unit 105, and supplies a detection result thereof to the operation determination unit 122.

The operation determination unit 122 determines details of the operation performed by the user on the basis of the detection result supplied from the operation detection unit 121 and supplies a determination result thereof to the display control unit 123.

The display control unit 123 controls display of an image of content, various screens, and the like displayed on the display unit 103 on the basis of the determination result supplied from the operation determination unit 122.

(Configuration of Remote Control)

Figure 3:
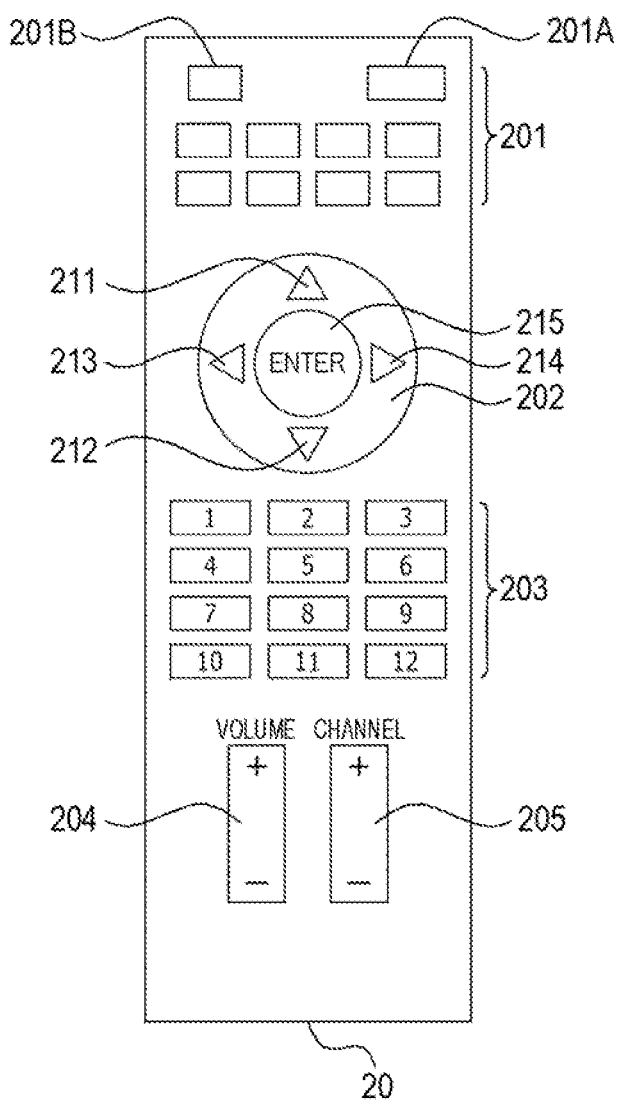
FIG. 3 illustrates an example of an appearance of a remote control in FIG. 1.

FIG. 3 illustrates an example of an appearance of the remote control 20 in FIG. 1.

The remote control 20 includes, as physical buttons, a button group 201 including various buttons and arrow buttons 202 for moving a cursor (pointer) or the like up, down, left, and right on the screen.

The button group 201 includes, for example, a power button 201A for turning on or off a power supply of the display control device 10, an input switching button 201B for switching signals to be input from the signal input units 101-1 to 101-N, and other buttons.

The arrow buttons 202 include an up key 211 for moving the cursor or the like upward, a down key 212 for moving the cursor or the like downward, a left key 213 for moving the cursor or the like leftward, and a right key 214 for moving the cursor or the like rightward. Further, the arrow buttons 202 further include an enter button 215 at the center thereof, the enter button being pressed when a selection is confirmed.

The remote control 20 also includes a channel selection button group 203 including notation buttons "1" to "12", a volume adjustment button 204 for arbitrarily adjusting the volume in an up direction or down direction, and a channel selection button 205 for arbitrarily selecting a channel in an up direction or down direction.

Note that the appearance of the remote control 20 in FIG. 3 is merely an example, and the remote control 20 may further include other buttons and the like.

The display control device 10 configured as described above can provide various functions, and can provide, for example, a function of simultaneously displaying a plurality of display screens. This function of displaying a plurality of display screens is assumed to be used in, for example, the following use cases.

First, there is a case where a user who is viewing content other than a television program (e.g., a moving image provided by an OTT service) temporarily switches to a two-split screen in order to determine whether to switch from the content to the television program.

At this time, it is assumed that the user desires to view two-split screen display in which a display screen of the television program is displayed together with a display screen of the moving image provided by the OTT service while continuously viewing the moving image. Further, it is also assumed that, in a case of this two-split screen display, the user desires to perform an operation (e.g., zapping, skipping commercials, or the like) on a second screen, i.e., on the display screen of the television program and then easily transition to either one of the display screens of the two-split screen.

In order to cope with such a case, for example, the display control device 10 is required to temporarily display the two-split screen, i.e., continuously display the moving image provided by the OTT service on one display screen and display the television program on the other display screen in an operable state until the user who is viewing the moving image provided by the OTT service determines a desired television program.

Therefore, the display control device 10 provides, for example, the following user interfaces (UI elements) as the function of displaying a plurality of display screens. That is, the display control device 10 provides a UI element for causing a screen to transition to a two-split screen while the user is viewing content, a UI element for adding an arbitrary display screen as the second screen, a UI element for operating the added display screen, and a UI element for displaying an arbitrary display screen of the two-split screen as one screen.

Because such user interfaces are provided, in a case where the user who is viewing a certain moving image causes a screen to transition to a two-split screen and then, during continuous viewing of the moving image on one display screen, desires to view a television program displayed on the other display screen, the user only needs to display the other display screen as one screen in order to switch content to be viewed from the moving image to the television program. Meanwhile, in a case where the screen transitions to the two-split screen and then the user does not desire to view the television program displayed on the other display screen, the user only needs to display the one display screen as one screen (return to the display of the one display screen) in order to continuously view the moving image.

Therefore, the user can determine content to be viewed next while continuously viewing a desired content. This makes it possible to reduce a time from the end of viewing certain content to the start of viewing the next content.

Second, there is a case where the screen is switched to a two-split screen in order to simultaneously view two different pieces of content (e.g., a television program and a game).

At this time, it is assumed that, for example, the user desires to view two-split screen display in which a display screen of a soccer broadcast program is displayed together with a display screen of a soccer game while playing the soccer game. Further, in a case of this two-split screen display, it is also assumed that the user desires to achieve a two-split screen that displays arbitrary pieces of content and to change a volume balance, image size, and the like of each screen of the two-split screen.

Therefore, the display control device 10 provides, as the function of displaying a plurality of display screens, a UI element for displaying arbitrary pieces of content as a two-split screen and a UI element for performing an operation of adjusting a volume balance between left and right display screens and image sizes of the left and right display screens.

Hereinafter, the function of displaying a plurality of display screens, which is provided by the display control device 10 to which the present technology is applied, will be described in detail with reference to the drawings.

Note that it can be said that the function of displaying a plurality of display screens is, for example, a function corresponding to a so-called multi-screen function, picture in picture (PIP) function, picture by picture (PBP) function, or the like. Further, in order to distinguish between a screen (entire screen) of the display unit 103 and one or a plurality of screens displayed on the display unit 103, the latter screen will be referred to as a display screen.

(Example of Transition from One Screen to Two-Split Screen)

Figure 4:
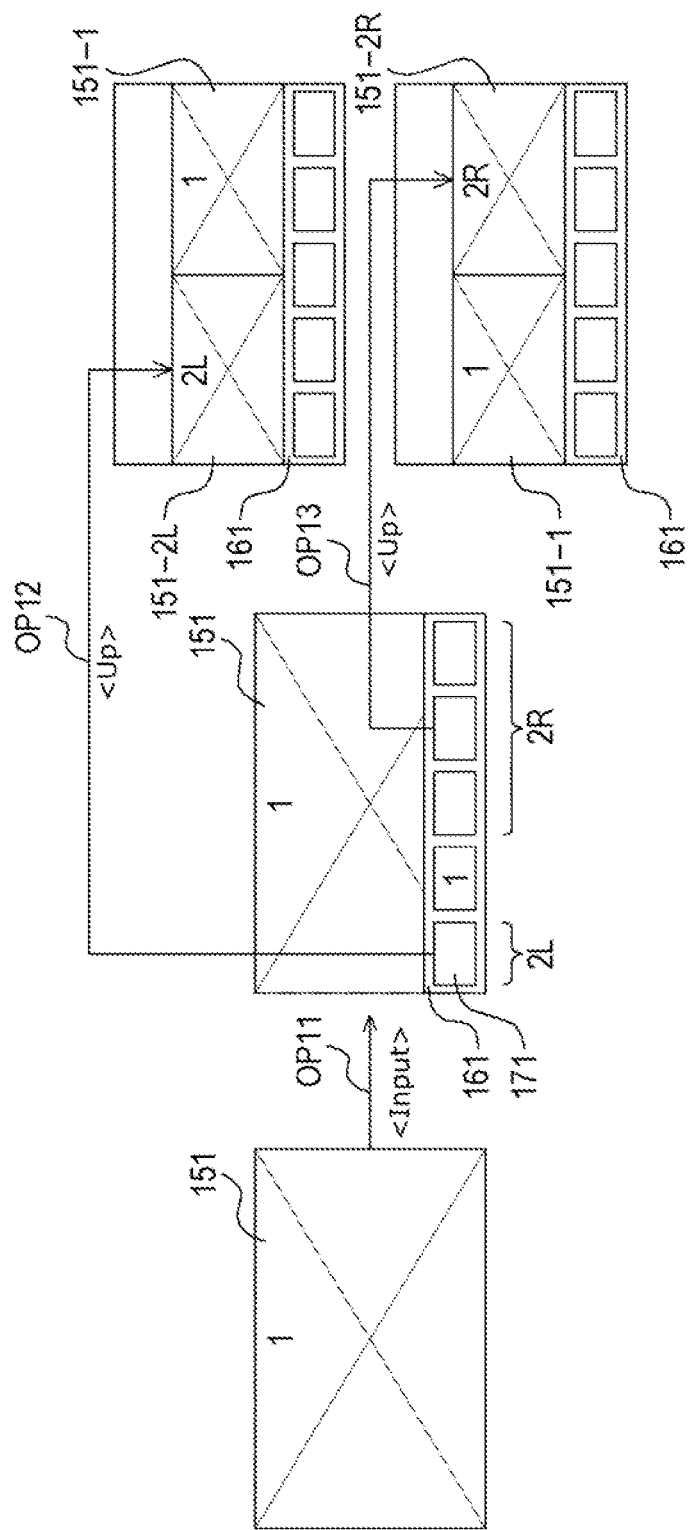
FIG. 4 illustrates an example of transition from one screen to a two-split screen.

FIG. 4 illustrates an example of transition from one screen to a two-split screen as the function of displaying a plurality of display screens.

FIG. 4 illustrates an example of behavior in response to operations OP11 to OP13 each of which is a user operation on the remote control 20, which is performed in a case where a display screen 151 displaying an image of content is displayed on the screen of the display unit 103 of the display control device 10.

Herein, for example, when the input switching button (INPUT) 201B is first operated as the operation OP11 by the user who is holding the remote control 20 while the display screen 151 is being displayed as one screen, an input switching menu 161 is displayed while being superimposed in a lower region of the display screen 151 displayed on the entire screen.

The input switching menu 161 is a user interface (UI) for switching a plurality of inputs in a case where the display control device 10 supports the plurality of inputs. A plurality of items 171 associated with the display screen 151 is displayed in the input switching menu 161. For example, in a case where an input is switchable not only to an input from the tuner, but also to an input from a player, recorder, game console, external storage, OTT service, or the like as the plurality of inputs, the items 171 having information (label) corresponding to the respective inputs are displayed.

Herein, among the plurality of items 171 displayed in the input switching menu 161, a currently selected item 171 associated with the currently displayed display screen 151 will also be referred to as an active item 171 (171-1A, 171-2A, or the like) in order to distinguish the active item 171 from the other items 171. Further, a desired item 171 selected by a user operation from the plurality of items 171 will also be referred to as a selected item 171 (171-2S or the like).

Furthermore, among the plurality of items 171, in particular, an item 171 displayed in a left region of the active item 171 (171-1A or the like) will also be referred to as a left item 171 (171-2L or the like), and an item 171 displayed in a right region of the active item 171 (171-1A or the like) will also be referred to as a right item 171 (171-2R or the like).

At this time, in a case where the left item 171-2L is selected by the user from the plurality of items 171 as the operation OP12, a display screen 151-1 corresponding to the active item 171-1A and a display screen 151-2L corresponding to the left item 171-2L are displayed as a two-split screen. Note that, as the operation OP12, for example, the arrow buttons 202 are operated to place the cursor on the left item 171-2L, and the up key 211 is pressed in that state.

In this two-split screen display, the display screen 151-2L corresponding to the left item 171-2L is displayed in a left region of the entire screen, whereas the display screen 151-1 corresponding to the active item 171-1A is displayed in a right region of the entire screen. Further, the input switching menu 161 is displayed in a region below the two-split screen.

That is, in a case where the active item 171-1A is set as a reference and the left item 171-2L displayed in the left region of the active item is selected, the display screen 151-2L corresponding to the left item 171-2L is displayed in a region corresponding to the left region (the left region of the entire screen).

Meanwhile, in a case where the right item 171-2R is selected by the user from the plurality of items 171 as the operation OP13, the display screen 151-1 corresponding to the active item 171-1A and a display screen 151-2R corresponding to the right item 171-2R are displayed as a two-split screen. Note that, as the operation OP13, for example, the arrow buttons 202 are operated to place the cursor on the right item 171-2R, and the up key 211 is pressed in that state.

In this two-split screen display, the display screen 151-2R corresponding to the right item 171-2R is displayed in the right region of the entire screen, and the display screen 151-1 corresponding to the active item 171-1A is displayed in the left region of the entire screen. Further, the input switching menu 161 is displayed in the region below the two-split screen.

That is, in a case where the active item 171-1A is set as a reference and the right item 171-2R displayed in the right region of the active item is selected, the display screen 151-2R corresponding to the right item 171-2R is displayed in a region corresponding to the right region (the right region of the entire screen).

Note that, although details will be described later, in this two-split screen display, another menu screen such as a control menu 163 (FIG. 15) may be displayed instead of the input switching menu 161.

Next, specific examples of transition from one screen to a two-split screen will be described with reference to display examples of the entire screen in FIGS. 5 to 9.

Figure 5:
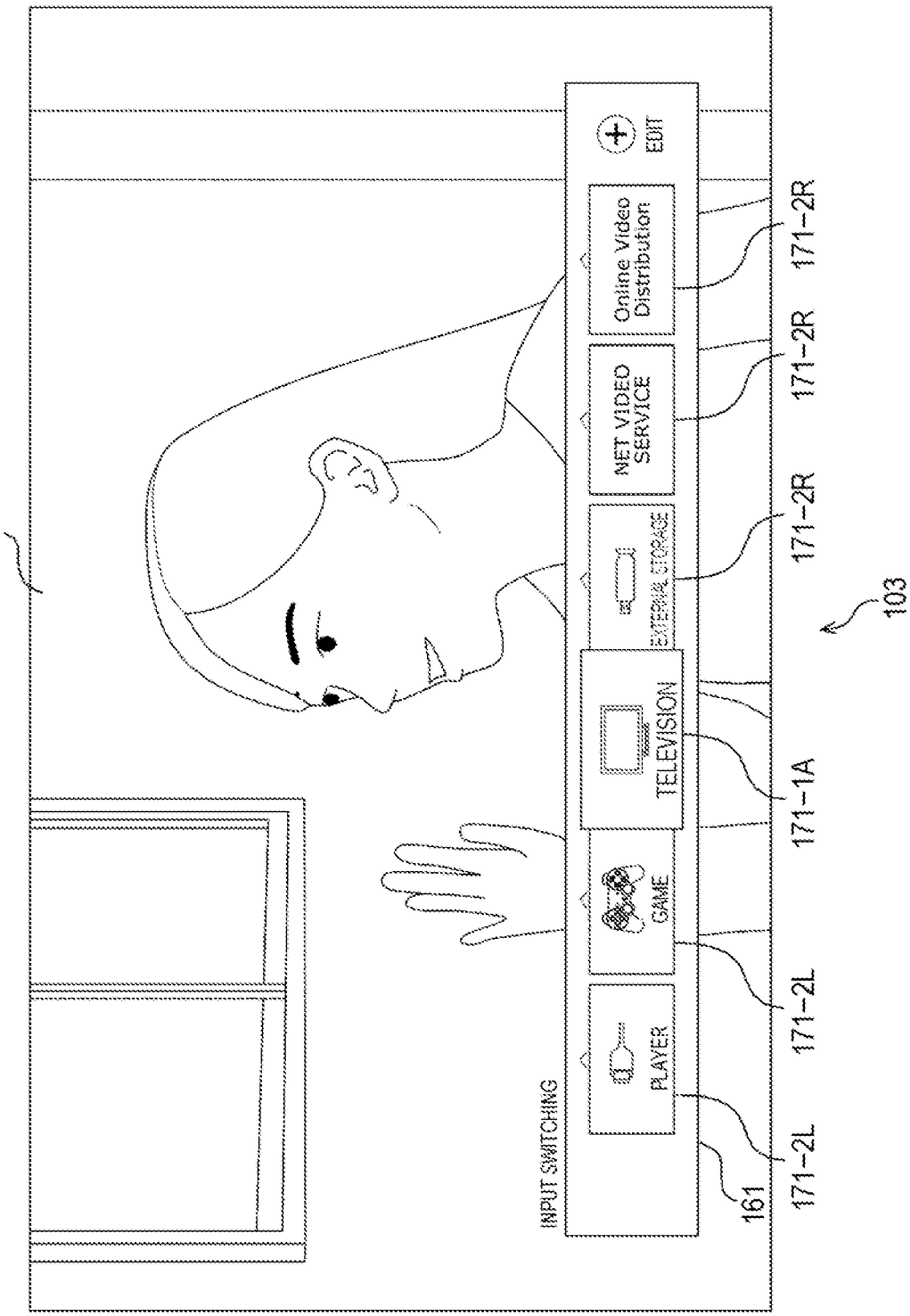
FIG. 5 illustrates an example of a screen that displays an input switching menu.

As illustrated in FIG. 5, in a case where the input switching button 201B is pressed by the user who is viewing a television program, the input switching menu 161 is displayed while being superimposed in the lower region of the display screen 151 of the television program displayed on the entire screen. The plurality of items 171 on each of which information (e.g., a label such as a character string or icon) corresponding to a player, game, television, external storage, or OTT service is written is displayed in the input switching menu 161.

Herein, the item 171 of the television serves as the active item 171-1A and is therefore highlighted (e.g., displayed largely, surrounded by a color frame, or displayed in other ways) as compared with the other items 171. Further, the items 171 of the player and game serve as the left items 171-2L, and the items 171 of the external storage and OTT service ("NET VIDEO SERVICE" and "Online Video Distribution" in FIG. 5) serve as the right items 171-2R.

Figure 6:
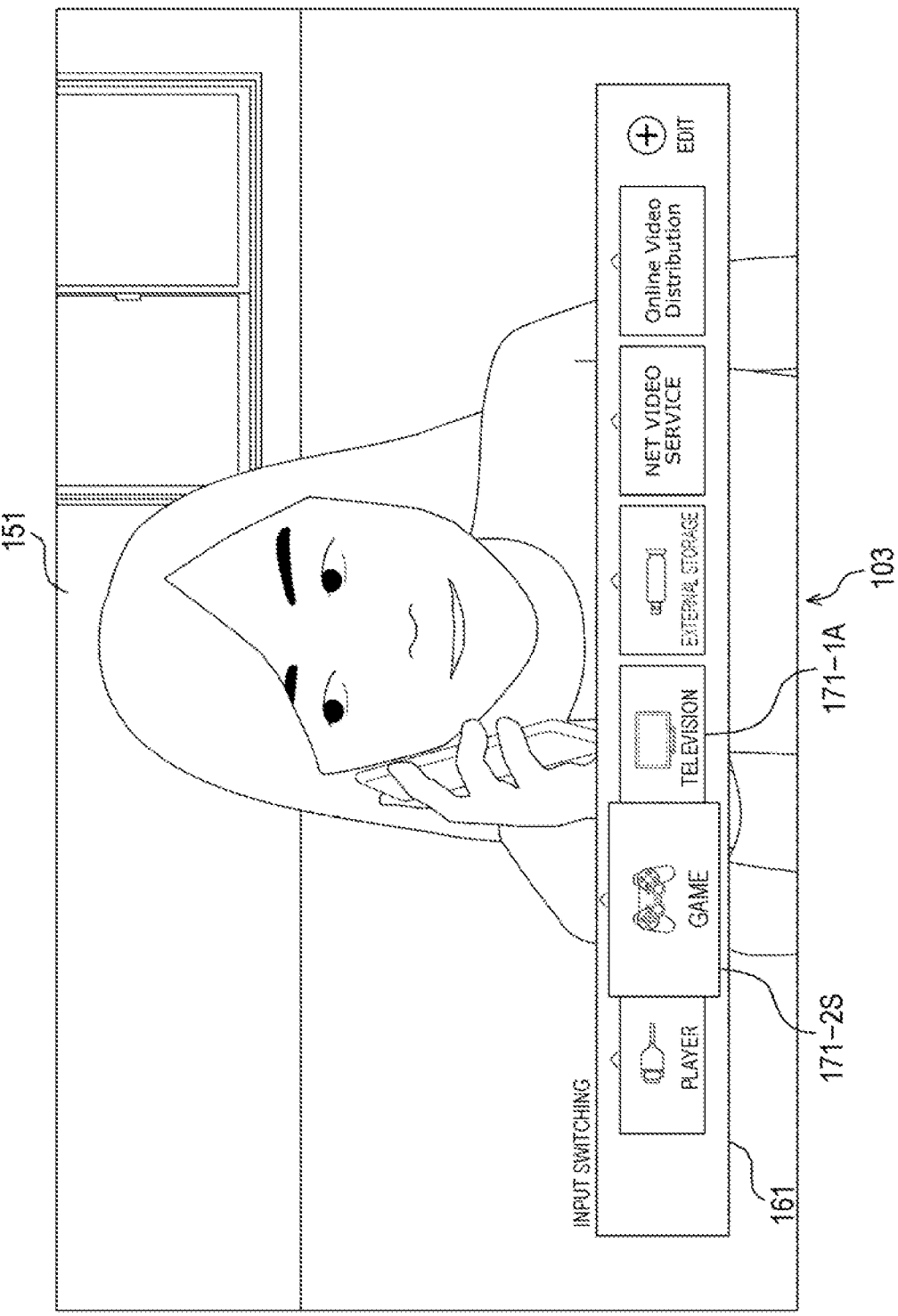
FIG. 6 illustrates a first example of a selected item selected from a plurality of items.
Figure 7:
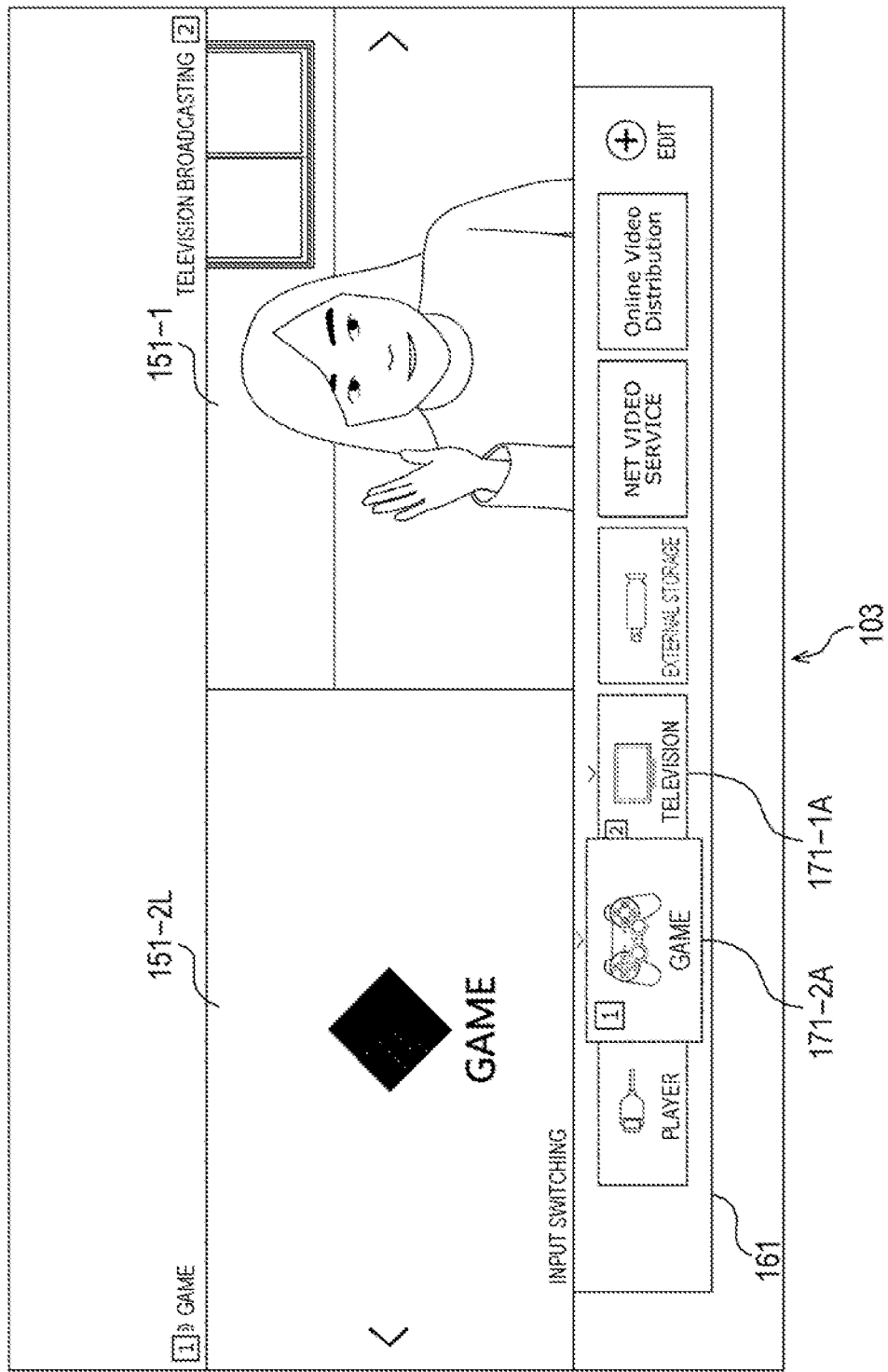
FIG. 7 illustrates a first example of two-split screen display.

At this time, as illustrated in FIG. 6, in a case where the user operates the arrow buttons 202 and presses the up key 211 while placing the cursor on the left item 171-2L of the game, the left item is selected as the selected item 171-2S, and a two-split screen illustrated in FIG. 7 is displayed.

In the two-split screen display of FIG. 7, the display screen 151-2L corresponding to the left item 171-2L of the game is displayed in the left region of the entire screen, and the display screen 151-1 of the television program is displayed in the right region of the entire screen. Further, in the input switching menu 161 below the left and right two-split screen, the item 171 of the game subjected to transition to the two-split screen is highlighted as the active item 171-2A, as compared with the other items 171.

As described above, when the left item 171-2L of the game displayed in the left region of the active item 171-1A of the television is selected while the display screen 151 of the television program is being displayed as one screen, the display screen 151-2L of the game (selected display screen) is displayed at a position (the left region of the entire screen) relative to a display position of the selected left item 171-2L (selected item 171-2S). Meanwhile, the display screen 151-1 of the television program (active display screen) is displayed in the right region opposite to the left region of the entire screen.

Note that, in FIG. 7, the active item 171-2A of the game and the display screen 151-2L are associated with each other by a numerical icon "1", and the active item 171-1A of the television program and the display screen 151-1 are associated with each other by a numerical icon "2".

Figure 8:
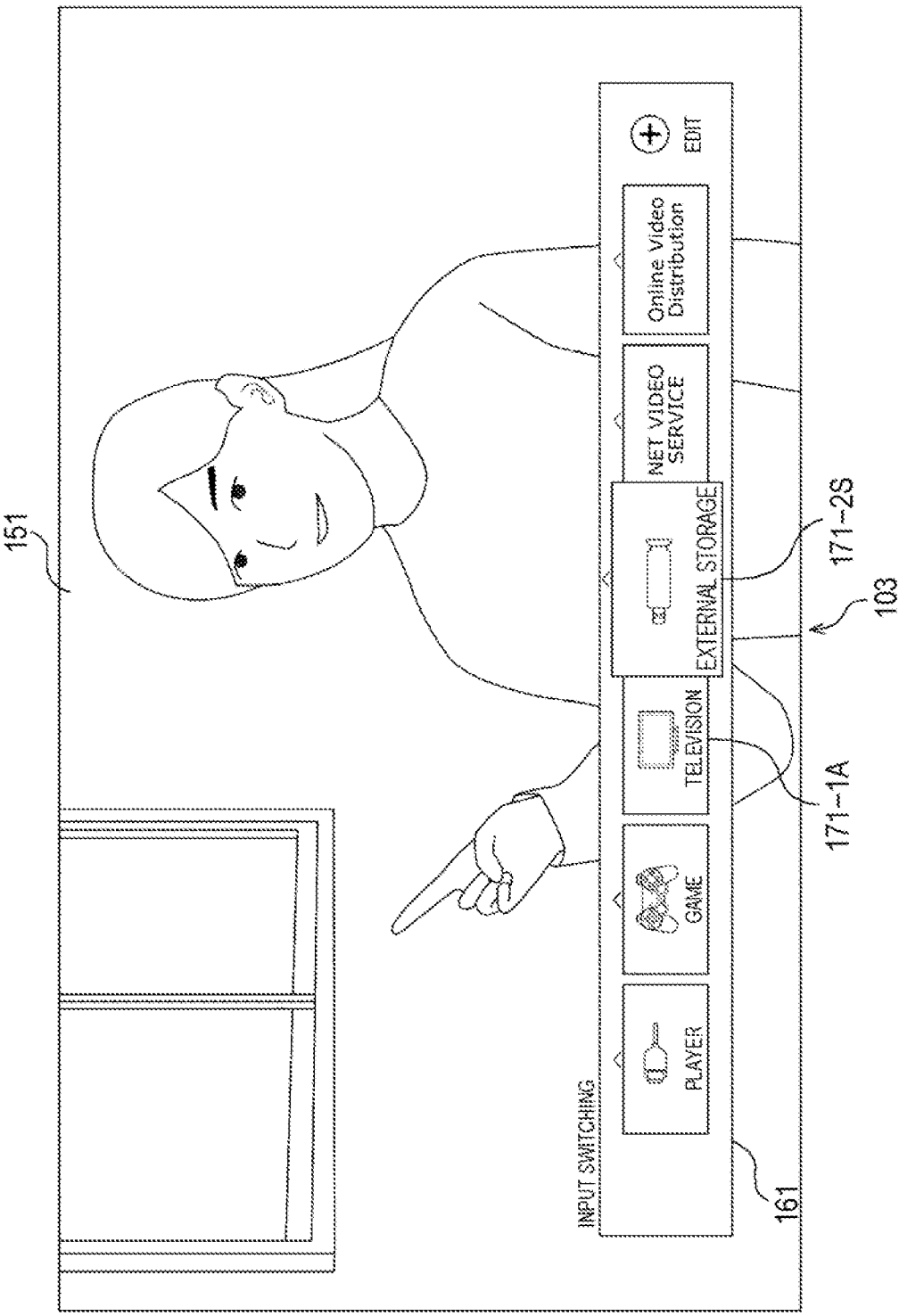
FIG. 8 illustrates a second example of a selected item selected from a plurality of items.
Figure 9:
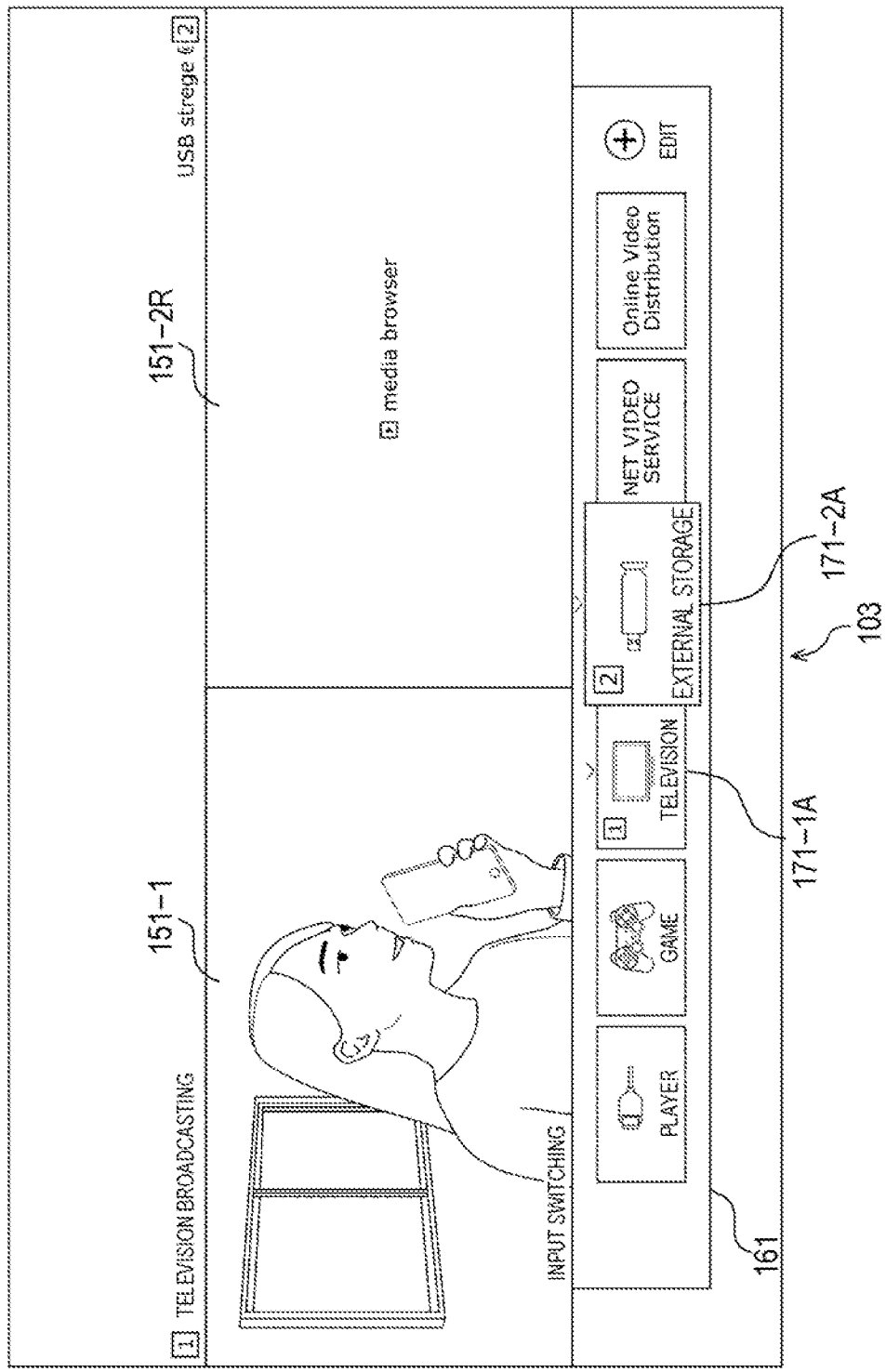
FIG. 9 illustrates a second example of two-split screen display.

Further, as illustrated in FIG. 8, when the user operates the arrow buttons 202 and presses the up key 211 while placing the cursor on the right item 171-2R of the external storage, the right item is selected as the selected item 171-2S, and a two-split screen illustrated in FIG. 9 is displayed.

In the two-split screen display of FIG. 9, the display screen 151-2R corresponding to the right item 171-2R of the external storage is displayed in the right region of the entire screen, and the display screen 151-1 of the television program is displayed in the left region of the entire screen. Further, in the input switching menu 161 below the left and right two-split screen, the item 171 of the external storage subjected to transition to the two-split screen is highlighted as the active item 171-2A, as compared with the other items 171.

As described above, when the right item 171-2R of the external storage displayed in the right region of the active item 171-1A of the television is selected while the display screen 151 of the television program is being displayed as one screen, the display screen 151-2R of the external storage (selected display screen) is displayed at a position (the right region of the entire screen) relative to a display position of the selected right item 171-2R (selected item 171-2S). Meanwhile, the display screen 151-1 of the television program (active display screen) is displayed in the left region opposite to the right region of the entire screen.

Note that, also in FIG. 9, the active item 171-1A of the television program and the display screen 151-1 are associated with each other by a numerical icon "1", and the active item 171-2A of the external storage and the display screen 151-2R are associated with each other by a numerical icon "2".

As described above, in a case where a desired item 171 (171-2L, 171-2R) is selected by a user operation from the plurality of displayed items 171, the display control device 10 displays the display screen 151 (151-2L, 151-2R) corresponding to the selected item 171 (171-2S) at a position relative to the display position of the selected item 171 (171-2S). This makes it possible to improve operability of the user in a case where a plurality of display screens is displayed by using the function of displaying a plurality of display screens.

That is, it is assumed that, when causing one screen to transition to a two-split screen, the user views the entire screen while viewing the active item 171-1A as a reference. Therefore, in a case where the left item 171-2L displayed in the left region of the reference is selected, the display screen 151-2L is displayed in the left region of the entire screen. Meanwhile, in a case where the right item 171-2R displayed in the right region of the reference is selected, the display screen 151-2R is displayed in the right region of the entire screen.

Because such display is performed, when one screen transitions to a two-split screen, a relationship between the two-split screen of the display screens 151-1 and 151-2 and the currently selected items 171 serving as the active items 171-1A and 171-2A becomes clear. This makes it possible to enhance visibility of the user, which results in improving the operability.

Herein, it is also possible to achieve a two-split screen display function by providing the remote control 20 with a two-split screen key for causing one screen to transition to a two-split screen. However, it is necessary to physically provide a new button, and, in addition, it is difficult to specify pieces of content to be displayed as a two-split screen depending on an operation of the two-split screen key. Meanwhile, the present technology can display images of desired pieces of content as a two-split screen by using the existing arrow buttons 202 as they are, without providing a new physical button.

Further, the above description shows that, in a case where the up key 211 is pressed in a state of one screen while the cursor is being placed on a desired item 171 (171-2L, 171-2R) among the plurality of items 171, the desired item 171 is selected as the selected item 171 (171-2S), and the one screen transitions to a two-split screen. However, when the enter button 215 is pressed while the cursor is being placed on the desired item 171 (171-2L, 171-2R), the display screen 151 corresponding to the item 171 on which the cursor is being placed is displayed as one screen.

As described above, in a case where the enter button 215 is operated instead of the up key 211 while the cursor is being placed on the desired item 171, an operation similar to that of normal input switching is performed. Therefore, it is possible to achieve a display function of a plurality of display screens (two-split screen), without impairing an input switching function provided by the input switching menu 161.

(Example of Transition from Two-Split Screen to Three-Split Screen)

Figure 10:
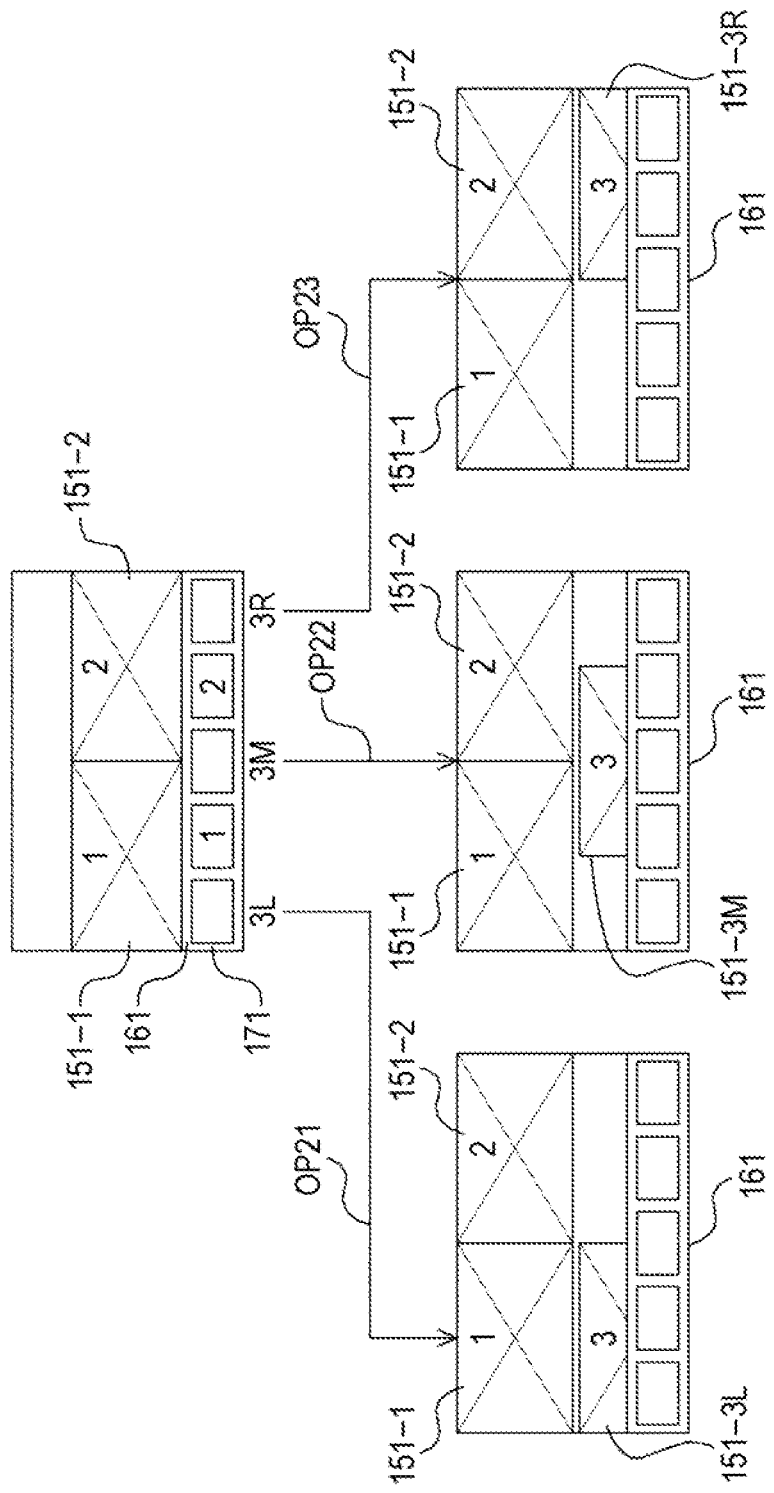
FIG. 10 illustrates an example of transition from a two-split screen to a three-split screen.

The above description shows an example where a two-split screen of the display screens 151-1 and 151-2 is displayed as the function of displaying a plurality of display screens. However, the same applies to three or more split screens. FIG. 10 illustrates an example of transition from a two-split screen to a three-split screen as the function of displaying a plurality of display screens.

FIG. 10 illustrates an example of behavior in response to operations OP21 to OP23 each of which is a user operation on the remote control 20, which is performed in a case where images of different pieces of content are displayed as a two-split screen on the screen of the display unit 103 of the display control device 10.

In this two-split screen display, a second item 171 from the left among five items 171 displayed in the input switching menu 161 serves as the active item 171-1A, and the display screen 151-1 corresponding to the active item 171-1A is displayed in the left region of the entire screen. Further, a second item 171 from the right among the five items 171 serves as the active item 171-2A, and the display screen 151-2 corresponding to the active item 171-2A is displayed in the right region of the entire screen.

At this time, in a case where a left item 171-3L furthest to the left is selected from the five items 171 as the operation OP21, the display screens 151-1 and 151-2 are displayed in respective upper left and upper right regions of a four-split screen into which the entire screen is divided, and a display screen 151-3L corresponding to the left item 171-3L is displayed in a lower left region thereof. Further, the input switching menu 161 is displayed in lower left and lower right regions, and the input switching menu 161 is displayed while being superimposed on a part of the lower left display screen 151-3L.

In this three-split screen display, both the display screens 151-1 and 151-3L corresponding to the active items 171-1A and 171-3A are displayed in the left region of the entire screen, and the display screen 151-2 corresponding to the active item 171-2A is displayed in the right region of the entire screen.

That is, in a case where the active items 171-1A and 171-2A are set as references and the left item 171-3L displayed in the left region of the active items is selected, the display screen 151-3L (selected display screen) is displayed at a position (the left region of the entire screen) relative to a display position of the selected left item 171-3L (selected item 171-3S).

Meanwhile, in a case where a middle item 171-3M in the middle of the five items 171 is selected as the operation OP22, the display screens 151-1 and 151-2 are displayed in respective upper left and upper right regions of a two-split screen into which the entire screen is vertically divided, and a display screen 151-3M corresponding to the middle item 171-3M is displayed in the middle of a lower region.

In this three-split screen display, the display screens 151-1 and 151-2 corresponding to the active items 171-1A and 171-2A are displayed in the respective upper right and upper left regions of the entire screen, and the display screen 151-3M corresponding to the active item 171-3A is displayed in the lower middle region of the entire screen.

That is, in a case where the active items 171-1 and 171-2 are set as references and the middle item 171-3M displayed in the middle region between the active items is selected, the display screen 151-3M (selected display screen) is displayed at a position (a region between the left and right regions of the entire screen) relative to a display position of the selected middle item 171-3M (selected item 171-3S).

Further, in a case where a right item 171-3R furthest to the right is selected from the five items 171 as the operation OP23, the display screens 151-1 and 151-2 are displayed in the respective upper left and upper right regions of the four-split screen into which the entire screen is divided, and a display screen 151-3R corresponding to the right item 171-3R is displayed in a lower right region thereof.

In this three-split screen display, the display screen 151-1 corresponding to the active item 171-1A is displayed in the left region of the entire screen, and both the display screens 151-2 and 151-3R corresponding to the active items 171-2A and 171-3A are displayed in the right region of the entire screen.

That is, in a case where the active items 171-1A and 171-2A are set as references and the right item 171-3R displayed in the right region of the active items is selected, the display screen 151-3R (selected display screen) is displayed at a position (the right region of the entire screen) relative to a display position of the selected right item 171-3R (selected item 171-3S).

Note that the above description shows examples of two-split screen display and three-split screen display as examples of the function of displaying a plurality of display screens. However, also in a case where four or more display screens are displayed, it is similarly possible to display the display screen 151 corresponding to the selected item 171 at a position relative to a display position of the selected item 171. Therefore, also in a case where four or more display screens are displayed, it is possible to improve the operability thereof.

Further, similar display is also applicable to a case where a plurality of display screens is displayed as a two-dimensional list. Furthermore, the above description shows an example where, in a case of two-split screen display, the display screens 151-1 and 151-2 are displayed to be arranged in a left and right direction, i.e., a horizontal direction. However, for example, the display screens 151-1 and 151-2 may be displayed to be arranged in an up and down direction, i.e., a vertical direction.

Further, the above description shows a case where images of different kinds of content, such as a television program and a game or a television program and a moving image, for example, are displayed on a plurality of display screens. However, pieces of the same kind of content may be displayed. For example, television programs of different channels may be displayed as a two-split screen by allowing the signal input units 101-1 to 101-N to receive inputs from a plurality of tuners. Further, in a case where the display screen 151 corresponding to the selected item 171 is displayed, a visual effect may be added. For example, the display screen 151 may be displayed so as to spread from the item 171.

(Relationship between Multi-Screen Display and Items)

Incidentally, in a case where the number of items 171 to be displayed in the input switching menu 161 increases, all the items 171 cannot be displayed on the screen. This makes it difficult to understand a relationship between the plurality of display screens 151 displayed as a two-split screen or three-split screen and the active items 171.

Figure 11:
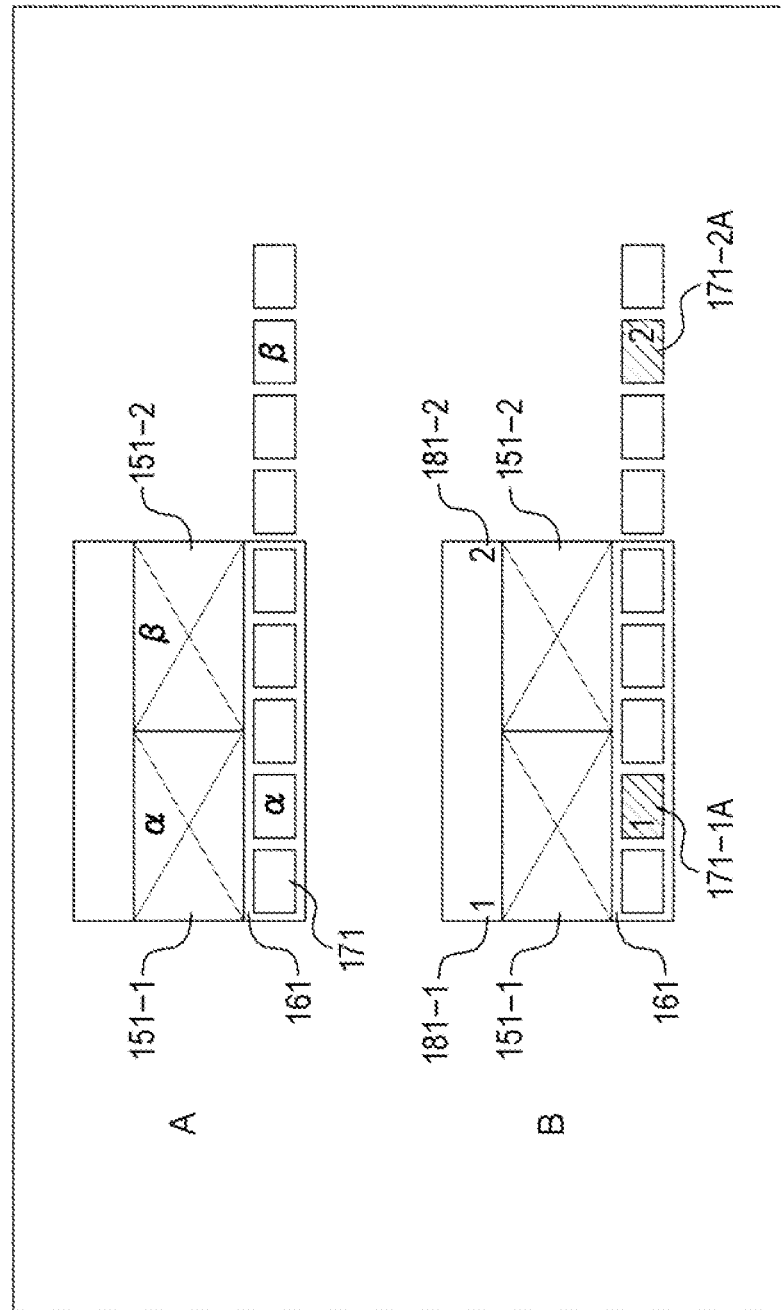
FIG. 11 illustrates a first example of association between an active item and a display screen.

For example, as illustrated in A of FIG. 11, it is assumed that, in a case where the display screens 151-1 and 151-2 are displayed as a two-split screen, an active item 171-a corresponding to the display screen 151-1 is displayed in the input switching menu 161, but an active item 171-8 corresponding to the display screen 151-2 goes off the screen.

However, "α" and "β" are written herein for convenience of description, but are not written in practice. Therefore, the active items 171-α and 171-β cannot be associated with display screens 151-1(*a*) and 151-2((β). Further, hidden items 171 are also illustrated for convenience of description, but only items 171 represented by five squares in the input switching menu 161 are displayed in practice, and items 171 represented by four squares on the right side thereof are hidden (which can be displayed by scrolling).

In such a case, it is difficult to understand a relationship between the items 171 displayed in the input switching menu 161 and the display screens 151-1 and 151-2 of the two-split screen, i.e., a relationship between the active item 171-α(171-β) and the display screen 151-1 or 151-2.

That is, in the example in A of FIG. 11, the user cannot easily understand which of the display screens 151-1 and 151-2 the active item 171-α displayed in the input switching menu 161 is associated with. Therefore, for example, in a case where a two-split screen transitions to a three-split screen, the following problem arises, for example: it is difficult to understand to which region of the screen that currently displays the display screens 151-1 and 151-2 as the two-split screen the third display screen 151-3 is added to.

In view of this, in order to easily understand a positional relationship between the active items 171 and the plurality of display screens 151, the display control device 10 can provide, for example, the following two methods as the function of displaying a plurality of display screens.

As illustrated in B of FIG. 11, a first method is to associate the active items 171 with the plurality of display screens 151 by using, for example, association information such as numbers and symbols. In the example in B of FIG. 11, the display screens 151-1 and 151-2 and the active items 171-1A and 171-2A corresponding thereto are associated with each other by association information indicating numbers.

Specifically, in a case of the two-split screen display, a number "1" is assigned to both the display screen 151-1 in the left region and the active item 171-1A to associate the display screen and the active item with each other. Meanwhile, a number "2" is assigned to both the display screen 151-2 in the right region and the active item 171-2A to associate the display screen and the active item with each other.

In the example in B of FIG. 11, the number "1" is displayed as association information 181-1 in a part above the display screen 151-1, and the number "1" is also displayed on the active item 171-1A. Therefore, the user can recognize that the active item 171-1A corresponds to the display screen 151-1.

Further, in the example in B of FIG. 11, the number "2" is displayed as association information 181-2 in a part above the display screen 151-2, but the item 171 on which the number "2" is displayed is not displayed. However, because the active item 171-1A is displayed, the user can recognize that the active item 171-2A goes off the screen, i.e., is hidden (which can be displayed by scrolling in a left direction, for example).

As described above, because the active items 171 and the corresponding display screens 151 are associated with each other by using the numbers "1" and "2", even if one active item 171 is displayed on the screen and the other active item 171 goes off the screen, it is possible to easily understand which of the display screens 151 displayed as the two-split screen the one active item 171 is associated with.

Note that, also in the display examples of FIGS. 7 and 9 described above, the active items 171-1A and 171-2A are associated with the display screens 151-1 and 151-2 by the numbers "1" and "2".

Figure 12:
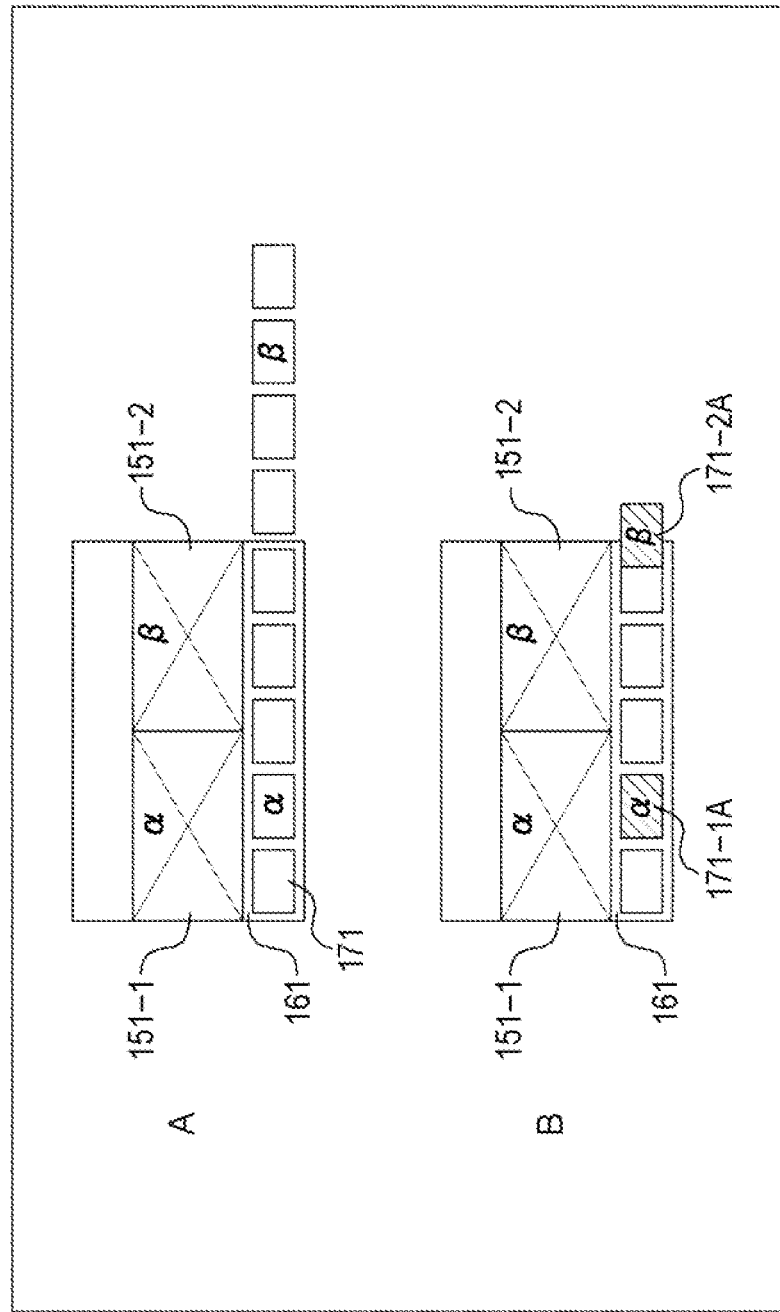
FIG. 12 illustrates a second example of association between an active item and a display screen.

As illustrated in B of FIG. 12, a second method is to prevent the active item 171 from going off the screen even in a case where there are a large number of items 171 to be displayed in the input switching menu 161. Note that A of FIG. 12, as well as A of FIG. 11, illustrates a problem regarding the positional relationship between the active item 171 and the corresponding display screen 151.

In the example in B of FIG. 12, in a case where the active item 171 goes off the screen, at least a part of the active item 171 is displayed in the input switching menu 161 (on the screen).

Specifically, in a case where, in two-split screen display, the active item 171-1A corresponding to the display screen 151-1 in the left region is displayed on the screen but the active item 171-2A corresponding to the display screen 151-2 in the right region goes off the screen, a part (e.g., a substantially left half region) of the active item 171-2A is displayed in (a region including a right end of) the input switching menu 161.

Because, in the example in B of FIG. 12, a part of the active item 171-2A is displayed in the input switching menu 161 together with the active item 171-1A, the positional relationship between the active items 171-1A and 171-2A and the left and right display screens 151-1 and 151-2 displayed as the two-split screen becomes clear.

As described above, because at least a part of the active item 171 that goes off the screen is displayed on the screen, even if one active item 171 is displayed on the screen and the other active item 171 goes off the screen, it is possible to easily understand which of the display screens 151 displayed as the two-split screen each active item 171 is associated with.

Note that the example in B of FIG. 12 illustrates a case where the active item 171-2A goes off the screen. However, in a case where the active item 171-1A goes off the screen, a part (e.g., a substantially right half region) of the active item 171-1A can be displayed in (a region including a left end of) the input switching menu 161.

Further, in a case where both the active items 171-1A and 171-2A go off the screen, it is only required to display both the part (e.g., the substantially right half region) of the active item 171-1A and the part (e.g., the substantially left half region) of the active item 171-2A in (the regions including the left and right ends of) the input switching menu 161.

Note that the above-described first and second methods are merely examples, and other methods may be used as long as, in a case where there is a plurality of pairs of the active items 171 and the display screens 151 (active display screens), the positional relationships between the active items 171 and the corresponding display screens 151 (active display screens) can be displayed to be recognizable by the user.

(Example of Control Menu)

The above description exemplifies a case where the input switching menu 161 is displayed in a region below a plurality of display screens such as a two-split screen or three-split screen. However, for example, a menu screen such as a control menu may be displayed.

For example, as illustrated in FIG. 13, a plurality of control items 172 to which functions such as adding and deleting the display screen 151 are assigned can be displayed as a control menu 162 in a similar manner to the above-described input switching menu 161. The functions assigned to the control items 172 can include, for example, functions illustrated in FIG. 14.

First, a function of adding the display screen 151 is to add the display screen 151 corresponding to the (desired) control item 172 to be increased by operating the arrow buttons 202 and pressing the up key 211 while placing the cursor on the control item 172. With this function, one screen transitions to a two-split screen or a two-split screen transitions to a three-split screen.

Second, a function of reducing the display screen 151 is to delete the display screen 151 corresponding to the (desired) control item 172 to be reduced by operating the arrow buttons 202 and pressing the down key 212 while placing the cursor on the control item 172. With this function, a two-split screen transitions to one screen or a three-split screen transitions to a two-split screen.

Third, a function of switching a target to be operated is to switch the control item 172 to be operated by operating the arrow buttons 202 and focusing on the desired control item 172 while placing the cursor on the control item 172. With this function, the desired control item 172 can be selected.

Herein, in the example of FIG. 13, the display screens 151-1 and 151-2 are displayed on the left and right sides of the two-split screen.

This two-split screen display is performed, for example, in a case where the display screen 151-1 is displayed as one screen and the up key 211 is pressed while the cursor is being placed on the control item 172-2 or in a case where the display screen 151-2 is displayed as one screen and the up key 211 is pressed while the cursor is being placed on the control item 172-1.

Further, when the down key 212 is pressed while the cursor is being placed on the control item 172-2 in this two-split screen display, the display screen 151-2 is deleted and the display screen 151-1 is displayed as one screen. Alternatively, when the down key 212 is pressed while the cursor is being placed on the control item 172-1 in this two-split screen display, the display screen 151-1 is deleted and the display screen 151-2 is displayed as one screen.

As described above, the input switching menu 161 is an example of the control menu 162, and, in a case where a first operation (e.g., pressing the up key 211) is performed on the desired control item 172, the desired control item 172 is selected as the selected control item 172, and the display screen 151 (selected display screen) is displayed. Further, in a case where a second operation (e.g., pressing the down key 212) is performed on the active item 172 that is the currently selected control item 172, the display screen 151 (active display screen) corresponding to the active item 172 is hidden.

Further, for example, as illustrated in FIG. 15, a dedicated menu for controlling a plurality of display screens, such as a two-split screen or three-split screen, can be displayed as the control menu 163. One or a plurality of control items 173 is displayed in the control menu 163. Functions assigned to the control items 173 can include, for example, functions illustrated in FIG. 16.

In a case where a control item 173-1 labeled "one screen: left" is operated (selected), the two-split screen transitions to one screen of the display screen 151-1 displayed on the left side of the two-split screen. Meanwhile, in a case where a control item 173-2 labeled "one screen: right" is operated, the two-split screen transitions to one screen of the display screen 151-2 displayed on the right side of the two-split screen.

In a case where a control item 173-3 labeled "operate left/operate right" is operated, a target to be operated of the two-split screen is changed to the left display screen 151-1 or right display screen 151-2.

In a case where a control item 173-4 labeled "enlarge: enlarge left" is selected, a region of the left display screen 151-1 of the two-split screen is enlarged, whereas a region of the right display screen 151-2 thereof is reduced. Meanwhile, in a case where a control item 173-5 labeled "enlarge: enlarge right" is selected, the region of the right display screen 151-2 of the two-split screen is enlarged, whereas the region of the left display screen 151-1 thereof is reduced.

In a case where a control item 173-6 labeled "volume balance: turn up left" is selected, volume of a sound corresponding to an image displayed on the left display screen 151-1 of the two-split screen is turned up, whereas volume of a sound corresponding to an image displayed on the right display screen 151-2 is turned down. In a case where a control item 173-7 labeled "volume balance: turn up right" is selected, the volume of the sound corresponding to the image displayed on the right display screen 151-2 of the two-split screen is turned up, whereas the volume of the sound corresponding to the image displayed on the left display screen 151-1 is turned down.

That is, crosstalk is allowable in the two-split screen display, and therefore it is possible to adjust the sounds corresponding to the images displayed on the respective left and right display screens 151-1 and 151-2 not to a volume balance such as 100:0 or 0:100 but to a volume balance such as 30:70.

In a case where a control item 173-8 labeled "close" is selected, the control menu 163 is closed.

Note that the functions of FIG. 16 are merely examples, and at least one function can be assigned to the control item 173. Further, functions other than the functions of FIG. 16 may be added. Furthermore, when, as an operation of the control item 173, for example, a predetermined button such as the enter button 215 is pressed while the cursor is being placed on a desired control item 173, a function corresponding to the control item 173 is executed.

Figure 17:
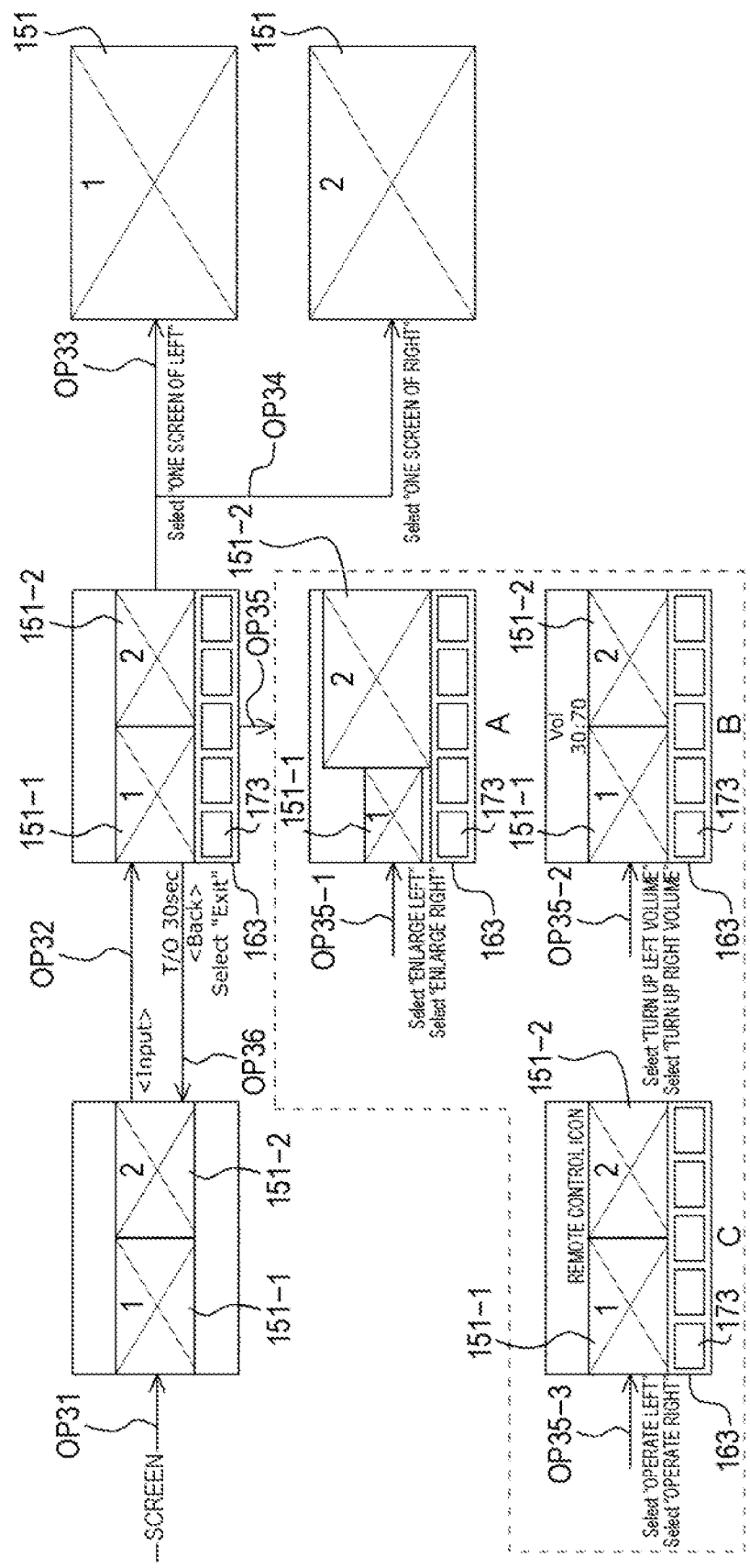
FIG. 17 illustrates an example of behavior performed when a control item of a control menu on a two-split screen is operated.

Herein, a specific example of an operation on the control item 173 displayed in the control menu 163 will be described with reference to FIG. 17. FIG. 17 illustrates an example of behavior performed in response to operations OP31 to OP36 each of which is a user operation on the remote control 20.

Herein, first, the operation OP31 is performed, and one screen transitions to a two-split screen. Thereafter, when a predetermined button such as the input switching button 201B is operated as the operation OP32, the control menu 163 is displayed in a region below the two-split screen. A plurality of control items 173 labeled with various item labels (FIG. 16) is displayed in the control menu 163.

At this time, when the control item 173-1 is selected as the operation OP33, the two-split screen transitions to one screen of the left display screen, and the left display screen 151-1 is displayed on the entire screen. Meanwhile, when the control item 173-2 is selected as the operation OP34, the two-split screen transitions to one screen of the right display screen, and the right display screen 151-2 is displayed on the entire screen.

Further, examples where the various control items 173 are selected as the operation OP35 are illustrated in a part surrounded by broken lines in FIG. 17 (A to C of FIG. 17).

Herein, when the control item 173-5 is selected as an operation OP35-1, the region of the right display screen 151-2 of the two-split screen is enlarged, whereas the region of the left display screen 151-1 thereof is reduced, i.e., the image sizes of the left and right display screens are scaled in conjunction with each other (A of FIG. 17).

Note that, although not illustrated, in a case where the control item 173-4 is selected, the region of the left display screen 151-1 of the two-split screen is enlarged, whereas the region of the right display screen 151-2 thereof is reduced.

Meanwhile, in a case where the control item 173-6 is selected as an operation OP35-2, volume of a sound corresponding to an image displayed on the left display screen 151-1 of the two-split screen is turned up, whereas volume of a sound corresponding to an image displayed on the right display screen 151-2 is turned down (B of FIG. 17). In this example, a ratio between the volume corresponding to the left display screen 151-1 and the volume corresponding to the right display screen 151-2 is 30:70.

Meanwhile, in a case where the control item 173-7 is selected, the volume of the sound corresponding to the image displayed on the right display screen 151-2 of the two-split screen is turned up, whereas the volume of the sound corresponding to the image displayed on the left display screen 151-1 is turned down, i.e., a mix balance of the volume on the two-split screen is adjusted. Note that a normal volume operation can be performed even in the two-split screen display, as well as in one-screen display.

Further, in a case where the control item 173-3 is selected as an operation OP35-3, a target to be operated on the two-split screen is changed to the left display screen 151-1 or right display screen 151-2. In this example, the right display screen 151 serves as the target to be operated, and an icon ("remote control icon" in FIG. 17) for identifying the target to be operated is displayed in a region above the right display screen (C of FIG. 17).

Note that, when the control item 173-8 is selected as the operation OP36 or when a predetermined time (e.g., 30 seconds or the like) elapses, the control menu 163 is closed.

As described above, because the control menu 163 is displayed as a menu screen for displaying a plurality of screens such as a two-split screen, it is possible to perform an operation on the plurality of screens (active display screens) immediately after displaying the plurality of screens.

Note that, in order to display the control menu 163 as the menu screen, for example, it is only required to switch the menu screen from the input switching menu 161 to the control menu 163 at a timing at which one screen is switched to a two-split screen.

(Method of Operating Plurality of Screens on Screen)

Figure 18:
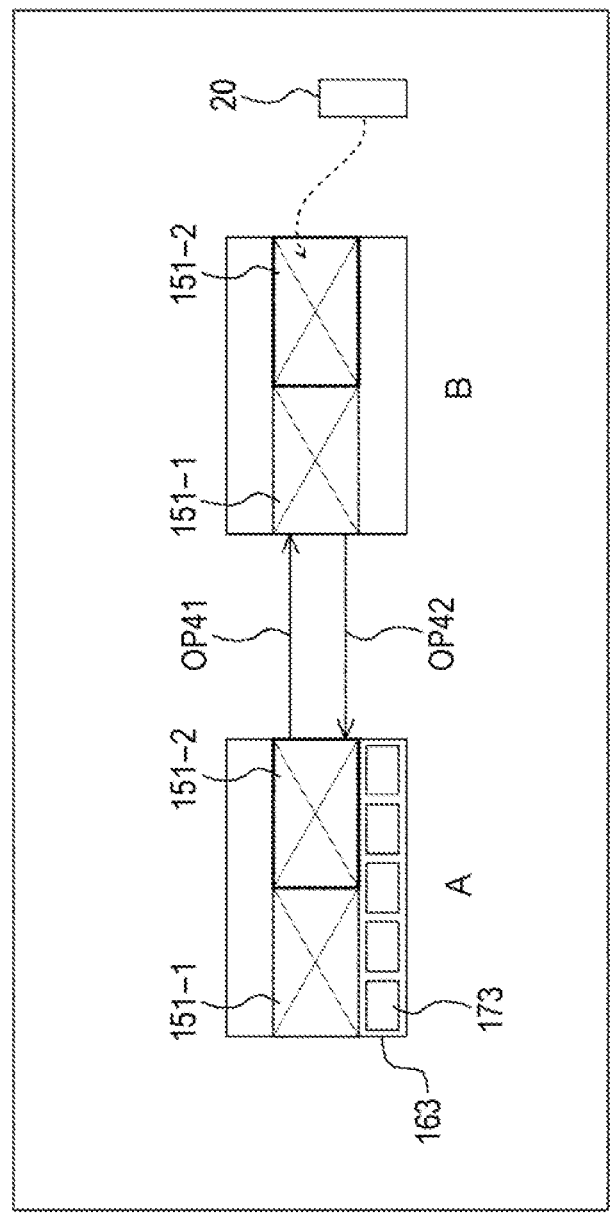
FIG. 18 illustrates an example of a display screen to be operated.

FIG. 18 illustrates an example of the display screen 151 to be operated in two-split screen display.

In FIG. 18, in a case of the two-split screen display, A of FIG. 18 illustrates an example of a screen on which the control menu 163 is superimposed, and B of FIG. 18 illustrates an example of a screen on which the control menu 163 is not superimposed.

Further, in a case where a predetermined operation is performed by the user as an operation OP41 while the screen in A of FIG. 18 is being displayed, the control menu 163 is closed, and the screen transitions from the screen in A of FIG. 18 to the screen in B of FIG. 18. Meanwhile, in a case where a predetermined operation is performed by the user as an operation OP42 while the screen in B of FIG. 18 is being displayed, the control menu 163 is opened, and the screen transitions from the screen in B of FIG. 18 to the screen in A of FIG. 18.

Herein, because the control menu 163 is displayed on the screen in A of FIG. 18, the left display screen 151-1 or the right display screen 151-2 can be selected as the display screen 151 to be operated on the two-split screen by operating the control item 173-3.

For example, in a case where the control item 173-3 of the control menu 163 is operated on the screen in A of FIG. 18 and the operation OP41 is performed while the right display screen 151-2 is being selected as the target to be operated, the control menu 163 is closed, and the screen in A of FIG. 18 transitions to the screen in B of FIG. 18.

At this time, on the screen in B of FIG. 18, a key for operating the screen is transmitted to the right display screen 151-2 that is currently selected as the target to be operated. Therefore, the user can operate (content displayed on) the right display screen 151-2 by operating the remote control 20.

That is, the state of the display screen 151 to be operated, which has been selected by (the control item 173-3 of) the control menu 163, is kept even in a state in which the control menu 163 is closed. In other words, one display screen 151 of the two-split screen has control in the two-split screen display, and, in order to switch the control, it is necessary to operate (the control item 173-3 of) the control menu 163.

However, a call operation of a function, which is used in common for all the functions provided by the display control device 10, such as the control menu 163, is not transmitted to the display screen 151 to be operated, but is used as a common function of the display control device 10, as in a case of one-screen display. Examples of an operation corresponding to the common function include not only activation of the control menu 163, but also operations on a power supply, volume, and the like, activation of a main menu, and activation of the input switching menu 161, for example.

Figure 19:
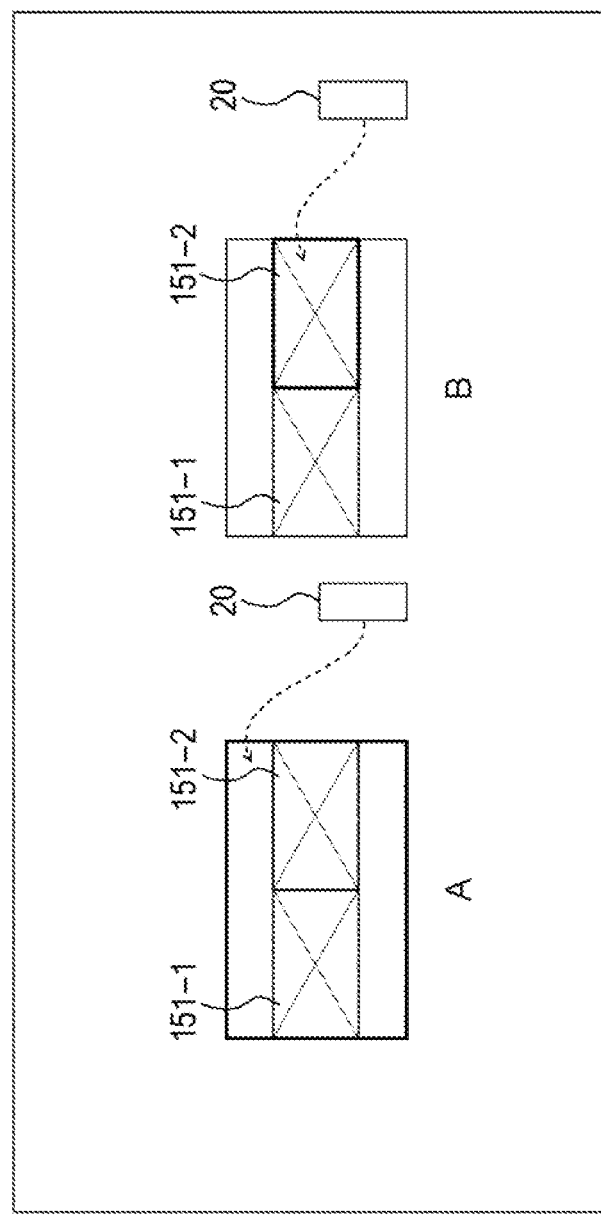
FIG. 19 illustrates an example of an entire screen and display screen to be operated.

Specifically, as illustrated in FIG. 19, examples of the operation corresponding to the common function related to the entire display control device 10 include activation of a menu screen such as the control menu 163 and operations on a power supply, volume, and the like (A of FIG. 19), and examples of an operation corresponding to a unique function related to the display screen 151 (active display screen) to be operated include an operation on an image or sound of content displayed on the display screen 151 (B of FIG. 19).

Note that the above description shows an example where the control item 173-3 of the control menu 163 is operated to select the display screen 151 to be operated on the two-split screen. However, instead of the control menu 163, another menu screen such as the control menu 162 may be activated to select the display screen 151 to be operated in response to a predetermined operation.

(Other Display Mode Examples)

The above-described display modes of the plurality of screens (two-split screen, three-split screen, and the like) are merely examples, and various display modes can be adopted.

Figure 20:
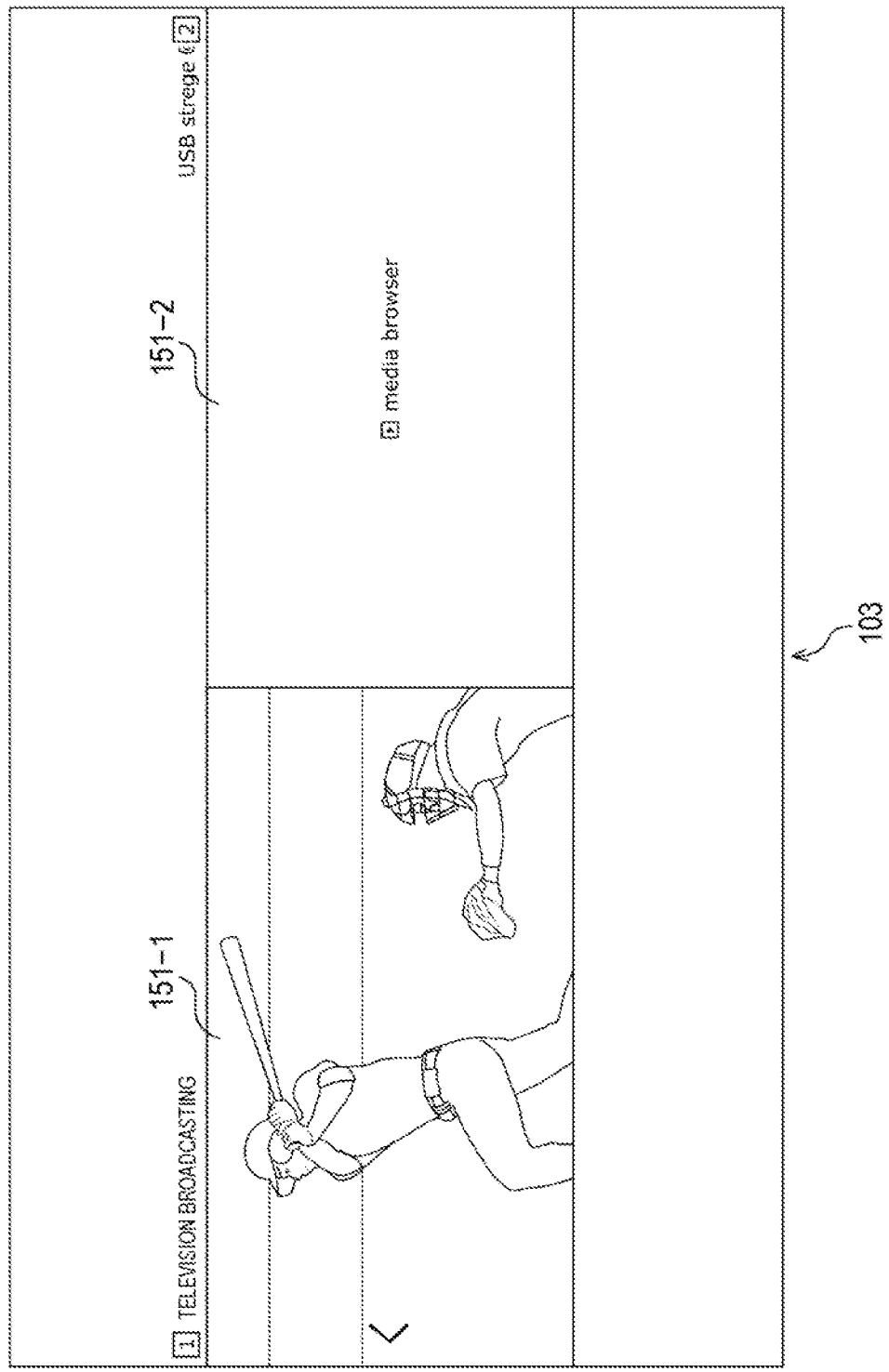
FIG. 20 illustrates an example of using blank spaces in two-split screen display.

For example, as illustrated in FIG. 20, in a case where a menu screen such as the input switching menu 161 or the control menu 163 is hidden in two-split screen display, blank spaces exist in regions above and below the two-split screen of the entire screen. Therefore, it is possible to perform display using the blank spaces.

In FIG. 20, each of the display screens 151-1 and 151-2 of the two-split screen is a horizontally long screen having an aspect ratio of 16:9 or the like, but, for example, at least one display screen 151 of the two-split screen may be a vertically long screen including the blank spaces above and below the screen. In particular, the OTT service can support vertically long display of a screen such as a menu screen in some cases. In such a case, for example, it is possible to display the menu screen of the OTT service larger by providing the vertically long display screen 151 in accordance with the screen such as the menu screen. This makes it possible to enhance visibility of the menu screen.

Further, for example, in FIG. 20, subtitles of content displayed on the display screen 151-1 or 151-2, a screen (e.g., control panel or the like) for performing various settings, or the like may be displayed by using the blank spaces above and below the two-split screen.

Furthermore, the above description shows a case where a two-split screen is displayed when the item 171 in the input switching menu 161 is selected. However, a plurality of display screens may be displayed, for example, one screen may transition to a two-split screen when another displayed item (item) is selected.

Figure 21:
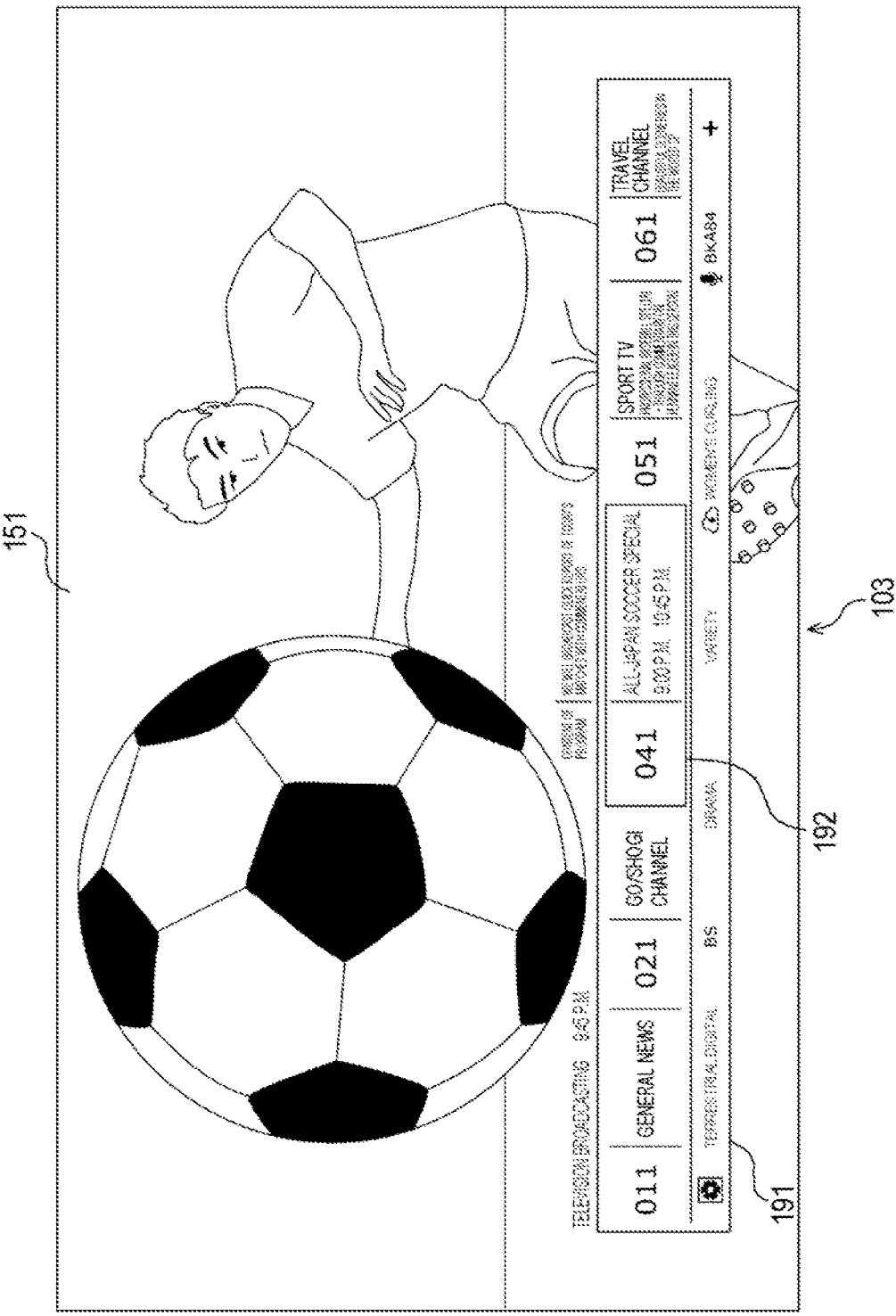
FIG. 21 illustrates another example of two-split screen display.

For example, as illustrated in FIG. 21, in a case where a program schedule 191 is superimposed in a lower region of an image of a television program on the display screen 151 and a desired television program is selected by, for example, pressing the up key 211 while a cursor 192 is being placed on a desired program section (item), the selected television program can be displayed as a two-split screen together with the currently viewed television program.

Note that, at this time, the display screen 151 (selected display screen) of the selected television program is displayed at a position relative to a display position of the program section (selected item) selected from the program schedule 191.

Specifically, in a case where, during viewing a program "All-Japan soccer special", a program section (e.g., a left item such as "General news" or "Go and Shogi channel") in a left region of a program section (active item) thereof is selected, a display screen 151 (active display screen) of the soccer program is displayed in the right region of the entire screen, and the display screen 151 (selected display screen) corresponding to the selected program section (selected item) in the left region is displayed in the left region of the entire screen.

Meanwhile, in a case where, during viewing the program "All-Japan soccer special", a program section (e.g., a right item such as "Sport TV" or "Travel channel") in a right region of a program section (active item) thereof is selected, the display screen 151 (active display screen) of the soccer program is displayed in the left region of the entire screen, and the display screen 151 (selected display screen) corresponding to the selected program section (selected item) in the right region is displayed in the right region of the entire screen.

Further, herein, a case of selecting a program section (item) displayed in the program schedule 191 has been described. However, the present disclosure is not limited thereto. For example, in a case where a recommended item such as a television program or website, an item corresponding to one of various applications, or the like is operated (e.g., the up key 211 is pressed), the display screen 151 corresponding to the selected item can be displayed as a two-split screen.

(Two-Split Screen Display Processing)

Next, a flow of two-split screen display processing executed by the control unit 100 will be described with reference to a flowchart of FIG. 22.

In step S11, the operation detection unit 121 detects a user operation on the remote control 20 on the basis of an operation signal from the operation acceptance unit 105.

In step S12, on the basis of a result of the detection in step S11, the operation determination unit 122 determines whether or not the item 171 displayed in the input switching menu 161 has been selected.

In a case where it is determined in the determination processing in step S12 that the item 171 has been selected by, for example, pressing the up key 211 while the cursor is being placed on the item 171, the processing proceeds to step S13.

In step S13, on the basis of the result of the detection in step S11, the operation determination unit 122 determines whether or not the selected item 171-2S is the left item 171-2L displayed in the left region of the active item 171-1A.

In a case where it is determined in the determination processing in step S13 that the selected item 171-2S is the left item 171-2L, the processing proceeds to step S14.

In step S14, the display control unit 123 displays the display screen 151-2L corresponding to the selected item 171-2S (selected left item 171-2L) in the left region of the entire screen and displays the display screen 151-1 corresponding to the active item 171-1A in the right region of the entire screen.

Meanwhile, in a case where it is determined in the determination processing in step S13 that the selected item 171-2S is the right item 171-2R, the processing proceeds to step S15.

In step S15, the display control unit 123 displays the display screen 151-2R corresponding to the selected item 171S (selected right item 171-2R) in the right region of the entire screen and displays the display screen 151-1 corresponding to the active item 171-1A in the left region of the entire screen.

Note that, in a case where it is determined in the determination processing in step S12 that the item 171 has not been selected, the processing proceeds to step S16. In step S16, the control unit 100 controls each unit to perform predetermined processing in response to a predetermined operation.

For example, in a case where the down key 212 is pressed while the cursor is being placed on the active item 171 corresponding to one display screen 151 in the two-split screen display, the other display screen 151 is displayed as one screen. Further, for example, in a case where the enter button 215 is pressed while the cursor is being placed on an arbitrary item 171, the display screen 151 corresponding to the item 171 is displayed as one screen.

In a case where the processing in step S14, S15, or S16 ends, the two-split screen display processing is terminated.

Hereinabove, the flow of the two-split screen display processing has been described. In this two-split screen display processing, a relationship between the selected item 171 and the display screen 151 becomes clear when the one screen transitions to the two-split screen. This makes it possible to enhance the visibility of the user, which results in improving the operability.

Figure 22:
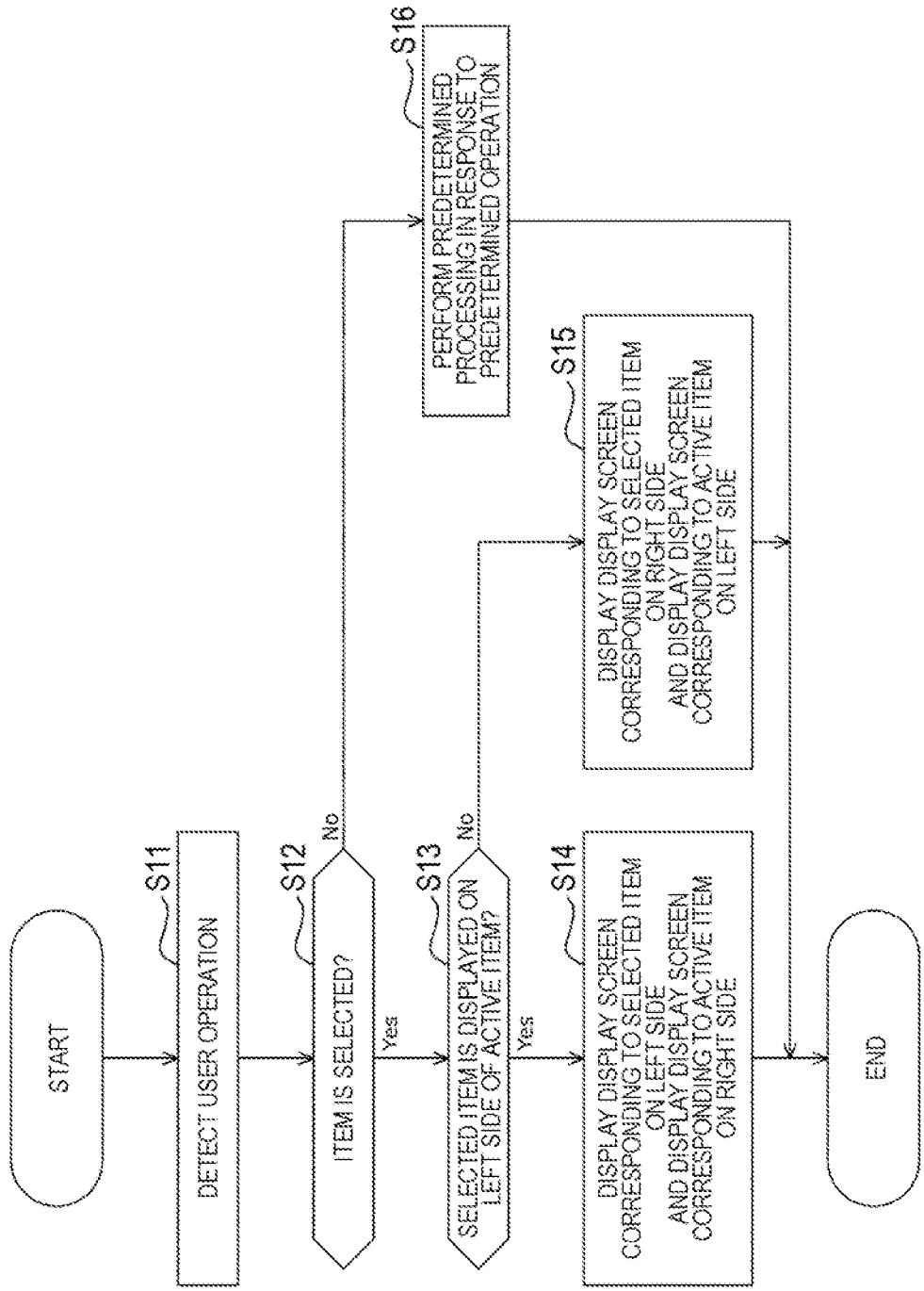
FIG. 22 is a flowchart showing a flow of two-split screen display processing.

Note that FIG. 22 shows the flow of the two-split screen display processing, and a flow of processing of displaying a plurality of screens, i.e., three or more screens will not be described. However, also in the processing of displaying a plurality of screens, i.e., three or more screens, the relationship between the selected item 171 and the display screen 151 becomes clear. This makes it possible to improve the operability.

2. MODIFICATION EXAMPLES

In the above description, the display control device 10 has been described as a television receiver, but is not limited thereto, and, for example, may be an electronic device such as a display, personal computer, tablet terminal, smartphone, mobile phone, head-mounted display, or game console.

Further, in the above description, the display control device 10 has been described as a television receiver including the display unit 103 such as a liquid crystal display unit or OLED display unit and the speaker 104. However, the display control device to which the present technology is applied may not include the display unit 103 or the speaker 104.

(Configuration of Display System)

Figure 23:
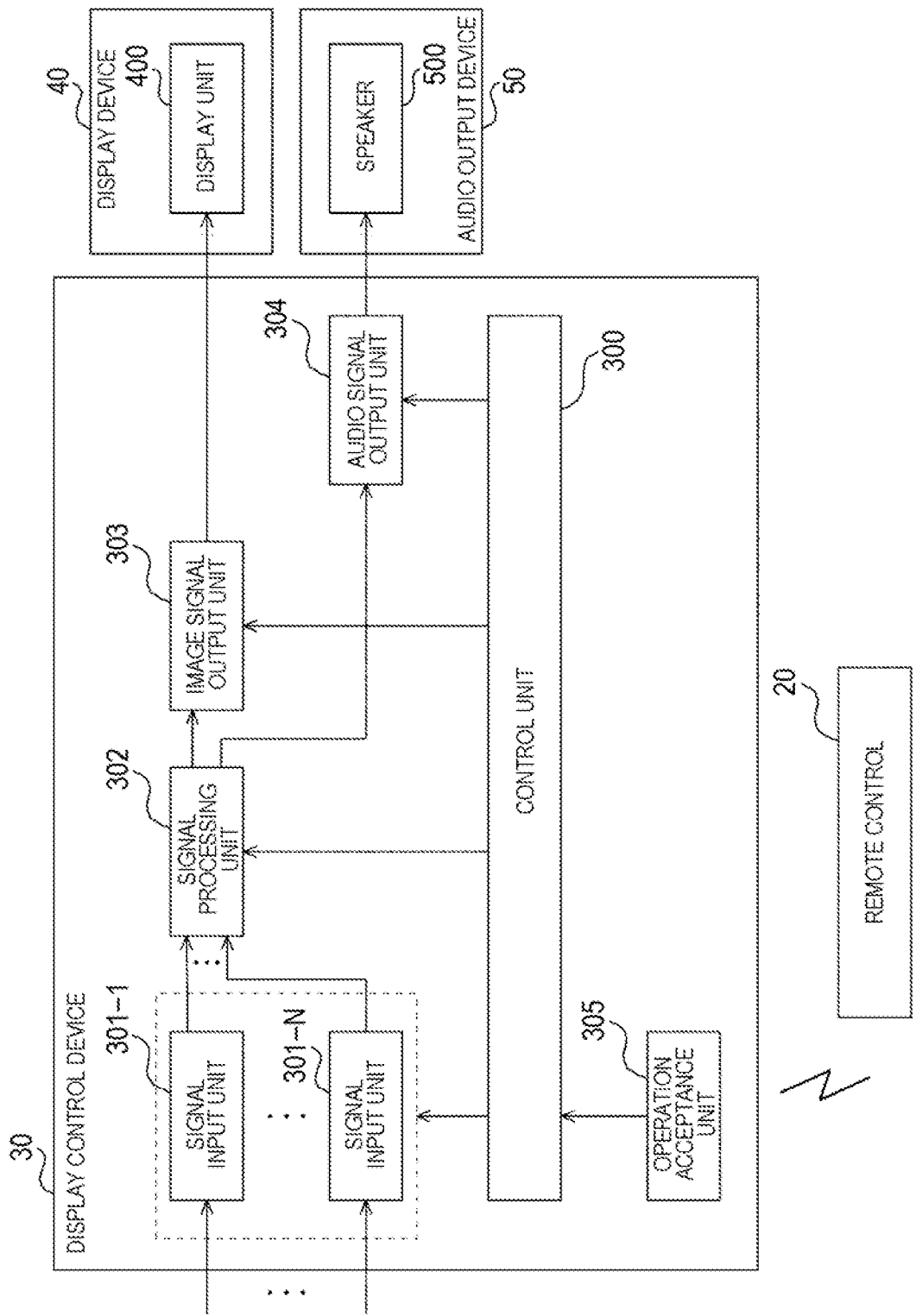
FIG. 23 is a block diagram illustrating a configuration example of an embodiment of a display system to which the present technology is applied.

FIG. 23 is a block diagram illustrating a configuration example of an embodiment of a display system to which the present technology is applied.

The display system of FIG. 23 includes a display control device 30, a display device 40, and an audio output device 50. The display control device 30 is, for example, an electronic device such as a set-top box, recorder, or player.

Further, the display device 40 is, for example, an electronic device such as a display, television receiver, tablet terminal, or personal computer. The audio output device 50 is, for example, an electronic device such as a speaker device. The display control device 30 is connected to both the display device 40 and the audio output device 50 by cables or the like via interfaces conforming to predetermined standards.

In FIG. 23, the display control device 30 includes a control unit 300, signal input units 301-1 to 301-N, a signal processing unit 302, an image signal output unit 303, an audio signal output unit 304, and an operation acceptance unit 305. Further, in FIG. 23, the display device 40 includes a display unit 400. Furthermore, the audio output device 50 includes a speaker 500.

The display control device 30 of FIG. 23 is different from the display control device 10 of FIG. 1 in that the image signal output unit 303 and the audio signal output unit 304 are provided instead of the display unit 103 and the speaker 104. However, other configurations, i.e., the control unit 300, the signal input units 301-1 to 301-N, the signal processing unit 302, and the operation acceptance unit 305 are similar to the control unit 100, the signal input units 101-1 to 101-N, the signal processing unit 102, and the operation acceptance unit 105.

The image signal output unit 303 outputs an image signal from the signal processing unit 302 to the display device 40 via the predetermined interface. The audio signal output unit 304 outputs an audio signal from the signal processing unit 302 to the audio output device 50 via the predetermined interface.

In the display device 40, the display unit 400 is similar to the display unit 103 of FIG. 1. Further, in the audio output device 50, the speaker 500 is similar to the speaker 104 of FIG. 1. That is, in the display system of FIG. 23, an image and various screens displayed on a screen of the display device 40, audio output from the audio output device 50, and the like are controlled by the display control device 30.

Note that FIG. 23 shows a case where the display control device 30 is connected to both the display device 40 and the audio output device 50 via the predetermined interfaces such as cables. However, the present technology is not limited to wired connection, and, for example, image signals and audio signals may be transmitted by wireless communication according to a communication method conforming to a predetermined standard. Further, a system means a set of a plurality of components (devices, modules (parts), and the like), and it does not matter whether or not all the components are included in the same housing.

Furthermore, the above description shows that operations on the display control device 10 and the display control device 30 are performed by user operations on the remote control 20. However, the present technology is not limited thereto, and, for example, a voice operation, gesture operation, or the like may be performed in response to the user's utterance, gesture, or the like. Still further, the display control device 10 (or display control device 30) and the remote control 20 may perform not only near-field wireless communication and infrared communication but also communication according to another communication method. The communication method herein is not limited to wireless communication, and may be wired communication.

3. CONFIGURATION OF COMPUTER

Figure 24:
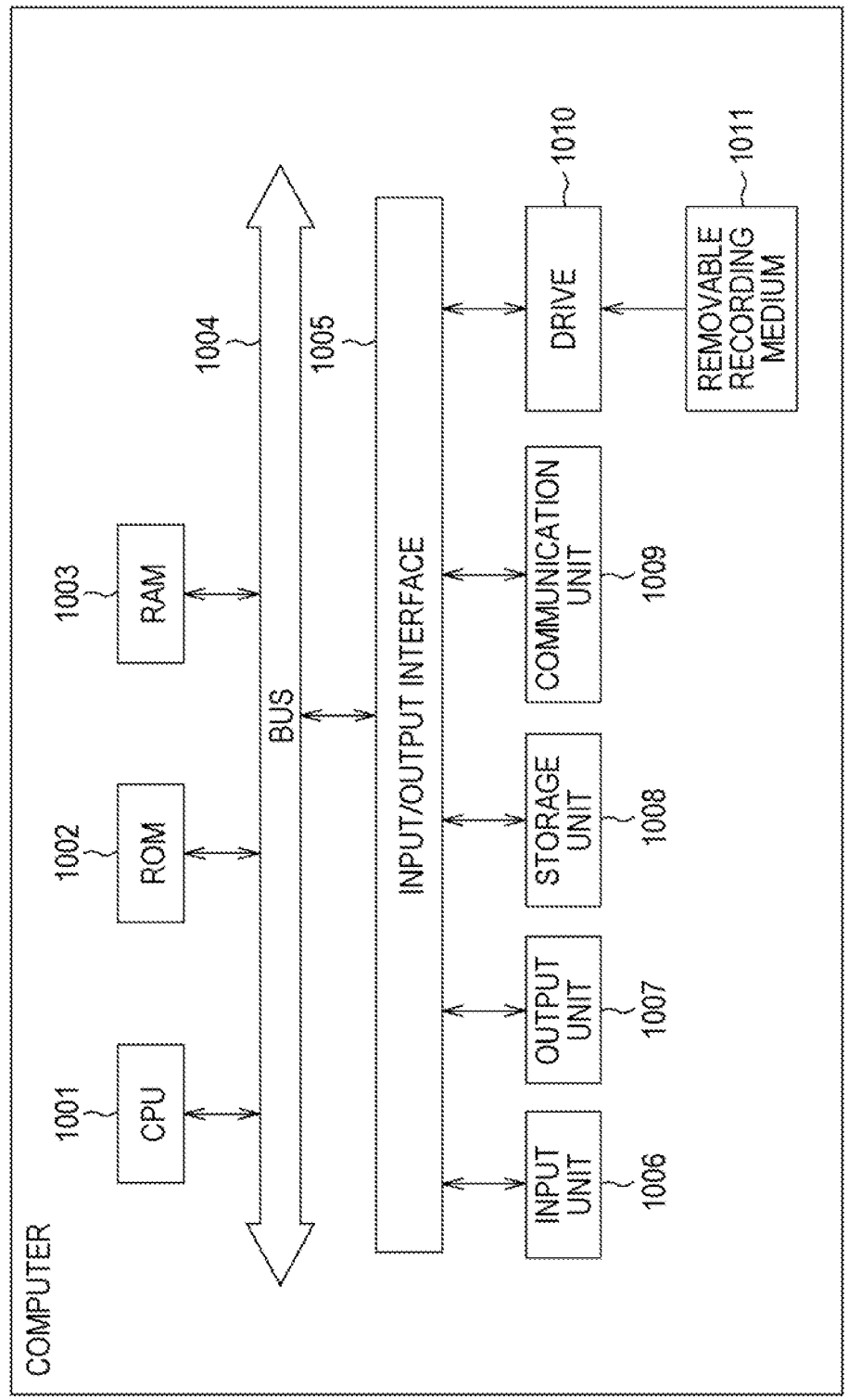
FIG. 24 illustrates a configuration example of a computer.

The above-described series of processing (e.g., the two-split screen display processing of FIG. 22) can be executed by hardware or software. In a case where the series of processing is executed by software, a program forming the software is installed in a computer of each device. FIG. 24 is a block diagram illustrating a configuration example of hardware of a computer that executes the above-described series of processing by a program.

In the computer of FIG. 24, a central processing unit (CPU) 1001, a read only memory (ROM) 1002, and a random access memory (RAM) 1003 are connected to each other by a bus 1004. The bus 1004 is further connected to an input/output interface 1005. The input/output interface 1005 is connected to an input unit 1006, an output unit 1007, a storage unit 1008, a communication unit 1009, and a drive 1010.

The input unit 1006 includes a microphone, keyboard, mouse, and the like. The output unit 1007 includes a speaker, display, and the like. The storage unit 1008 includes a hard disk, nonvolatile memory, and the like. The communication unit 1009 includes a network interface and the like. The drive 1010 drives a removable recording medium 1011 such as a magnetic disk, optical disk, magneto-optical disk, or semiconductor memory.

In the computer configured as described above, the above-described series of processing is performed by the CPU 1001 loading a program recorded on the ROM 1002 or storage unit 1008 into the RAM 1003 via the input/output interface 1005 and the bus 1004 and executing the program.

The program executed by the computer (CPU 1001) can be provided by, for example, being recorded on the removable recording medium 1011 as a package medium or the like. Further, the program can be provided via a wired or wireless transmission medium such as a local area network, the Internet, or digital satellite broadcasting.

In the computer, the program can be installed in the storage unit 1008 via the input/output interface 1005 by attaching the removable recording medium 1011 to the drive 1010. Further, the program can also be installed in the storage unit 1008 by being received by the communication unit 1009 via the wired or wireless transmission medium. In addition, the program can also be installed in the ROM 1002 or storage unit 1008 in advance.

Herein, in the present specification, the processing performed by the computer according to the program is not necessarily performed in time series in the order shown in the flowchart. That is, the processing performed by the computer according to the program also includes processing executed in parallel or individually (e.g., parallel processing or processing by an object). Further, the program may be processed by one computer (processor) or by a plurality of computers in a distributed manner.

Furthermore, each step in the two-split screen display processing of FIG. 22 can be executed by a single device or can be shared and executed by a plurality of devices. Still further, in a case where a single step includes a plurality of processes, the plurality of processes included in the single step can be executed by a single device or can be shared and executed by a plurality of devices.

Note that the embodiments of the present technology are not limited to the above embodiments and can be variously modified without departing from the gist of the present technology. For example, the present technology can have a configuration of cloud computing in which a single function is shared and jointly processed by a plurality of devices via a network.

Further, the present technology can also have the following configurations.

(1)

A display control device including a control unit that displays a plurality of items associated with a display screen, and in a case where a desired item is selected by a user operation from the plurality of displayed items, displays a selected display screen corresponding to the selected item together with the display screen that is currently displayed, the selected display screen being displayed at a position relative to a display position of the selected item.

(2)

The display control device according to (1), in which in a case where the selected item is selected while the control unit is displaying an active display screen corresponding to an active item serving as a currently selected item, the control unit displays the selected display screen at the position relative to the display position of the selected item on the basis of a display position of the active item.

(3)

The display control device according to (2), in which the control unit displays the active display screen in a second region different from a first region in which the selected display screen is displayed.

(4)

The display control device according to (3), in which in a case where the selected item is displayed in a left region of the active item, the control unit displays the selected display screen in a region corresponding to the left region and displays the active display screen in a region corresponding to a right region with respect to the left region, and in a case where the selected item is displayed in a right region of the active item, the control unit displays the selected display screen in a region corresponding to the right region and displays the active display screen in a region corresponding to a left region with respect to the right region.

(5)

The display control device according to (3), in which in a case where the selected item is displayed in a region between a first active item and a second active item, the control unit displays a first active display screen corresponding to the first active item in a left region of an entire screen, displays a second active display screen corresponding to the second active item in a right region of the entire screen, and displays the selected display screen in a region between the left region and the right region.

(6)

The display control device according to (5), in which in a case where the selected item is displayed in a left region of the first active item, the control unit displays the first active display screen and the selected display screen in the left region of the entire screen and displays the second active display screen in the right region of the entire screen, and in a case where the selected item is displayed in a right region of the second active item, the control unit displays the first active display screen in the left region of the entire screen and displays the second active display screen and the selected display screen in the right region of the entire screen.

(7)

The display control device according to any one of (1) to (6), in which the plurality of items is displayed on a predetermined menu screen.

(8)

The display control device according to (7), in which:

the menu screen includes an input switching menu for switching a signal to be input; and in a case where a first operation is performed on the desired item among the plurality of items displayed in the input switching menu, the control unit selects the desired item as the selected item and displays the selected display screen, and in a case where a second operation is performed on an active item serving as a currently selected item displayed in the input switching menu, the control unit hides an active display screen corresponding to the active item.

(9)

The display control device according to (8), in which:

the first operation includes an operation on an up key of arrow buttons provided in a remote control; and the second operation includes an operation on a down key of the arrow buttons.

(10)

The display control device according to (7), in which:

the menu screen includes a control menu that displays one or a plurality of control items to each of which a function for controlling an active display screen corresponding to an active item serving as a currently selected item is assigned; and in a case where a desired control item is selected from the one or plurality of control items displayed in the control menu, the control unit controls the active display screen in accordance with a function assigned to the selected control item.

(11)

The display control device according to (10), in which:

the function includes at least one of a function of causing the active display screen to transition to one screen, a function of changing the active display screen to be operated, a function of enlarging or reducing a size of the active display screen, or a function of changing a volume in accordance with the active display screen.

(12)

The display control device according to any one of (2) to (6), in which in a case where a plurality of pairs of the active items and the active display screens exists, the control unit performs display so that a positional relationship between each active item and the corresponding active display screen is identifiable.

(13)

The display control device according to (12), in which the control unit displays association information in which each active item and the corresponding active display screen are associated with each other.

(14)

The display control device according to (12), in which in a case where the active item goes off a screen, the control unit displays at least a part of the active item on the screen.

(15)

The display control device according to any one of (2) to (6), in which:

the user operation includes an operation corresponding to a common function related to the entire device and an operation corresponding to a unique function related to the active display screen; and the control unit controls the active display screen in a case where the operation corresponding to the unique function is performed.

(16)

The display control device according to any one of (1) to (15), in which the user operation includes an operation on arrow buttons provided in a remote control.

(17)

The dipsplay control device according to any one of (1) to (16), in which the display screen displays an image of content.

(18)

The display control device according to any one of (2) to (6), in which:

the active display screen displays an image of first content; and the selected display screen displays an image of second content different from the first content.

(19)

The display control device according to (17), in which:

the content includes broadcast content; and the display control device serves as a television receiver further including a display unit that displays the image of the content and a speaker that outputs a sound of the content.

(20)

A display control method including causing a display control device to display a plurality of items associated with a display screen, and in a case where a desired item is selected by a user operation from the plurality of displayed items, display a selected display screen corresponding to the selected item together with the display screen that is currently displayed, the selected display screen being displayed at a position relative to a display position of the selected item.

REFERENCE SIGNS LIST

10 Display control device
20 Remote control

30 Display control device
40 Display device
50 Audio output device
100 Control unit
100, 101-1 to 101 N Signal input unit
102 Signal processing unit
103 Display unit
104 Speaker
105 Operation acceptance unit
121 Operation detection unit
122 Operation determination unit
123 Display control unit
300 Control unit
301-1 to 301 N Signal input unit
302 Signal processing unit
303 Image signal output unit
304 Audio signal output unit
305 Operation acceptance unit
400 Display unit
500 Speaker
1001 CPU

The invention claimed is:

1. A display controller comprising:
control circuitry configured to
 display a plurality of items associated with a display screen, and
 in a case where a desired item is selected by a user operation from the plurality of displayed items, display a selected display screen corresponding to the selected item together with the display screen that is currently displayed, the selected display screen being displayed at a position B lay position of the selected item;
 wherein
  in a case where the selected item is selected while the control circuitry is displaying an active display screen corresponding to an active item serving as a currently selected item, the control circuitry displays the selected display screen at the position relative to the display position of the selected item on a basis of a display position of the active item;
 wherein
  the control circuitry displays the active display screen in a second region different from a first region in which the selected display screen is displayed
 wherein
  in a case where the selected item is displayed in a left region of the active item, the control circuitry displays the selected display screen in a region corresponding to the left region and displays the active display screen in a region corresponding to a right region with respect to the left region, and
  in a case where the selected item is displayed in a right region of the active item, the control circuitry displays the selected display screen in a region corresponding to the right region and displays the active display screen in a region corresponding to a left region with respect to the right region.

2. A display controller comprising:
control circuitry configured to
 display a plurality of items associated with a display screen, and
 in a case where a desired item is selected by a user operation from the plurality of displayed items, display a selected display screen corresponding to the selected item together with the display screen that is currently displayed, the selected display screen being displayed at a position relative to a display position of the selected item;
 wherein
  in a case where the selected item is selected while the control circuitry is displaying an active display screen corresponding to an active item serving as a currently selected item, the control circuitry displays the selected display screen at the position relative to the display position of the selected item on a basis of a display position of the active item;
 wherein
  the control circuitry displays the active display screen in a second region different from a first region in which the selected display screen is displayed;
 wherein
  in a case where the selected item is displayed in a region between a first active item and a second active item, the control circuitry displays a first active display screen corresponding to the first active item in a left region of an entire screen, displays a second active display screen corresponding to the second active item in a right region of the entire screen, and displays the selected display screen in a region between the left region and the right region.

3. The display controller according to claim 2, wherein
in a case where the selected item is displayed in a left region of the first active item, the control circuitry displays the first active display screen and the selected display screen in the left region of the entire screen and displays the second active display screen in the right region of the entire screen, and
in a case where the selected item is displayed in a right region of the second active item, the control circuitry displays the first active display screen in the left region of the entire screen and displays the second active display screen and the selected display screen in the right region of the entire screen.

4. The display controller according to claim 1, wherein
the plurality of items is displayed on a predetermined menu screen.

5. The display controller according to claim 4, wherein:
the menu screen includes an input switching menu for switching a signal to be input; and
in a case where a first operation is performed on the desired item among the plurality of items displayed in the input switching menu, the control circuitry selects the desired item as the selected item and displays the selected display screen, and
in a case where a second operation is performed on an active item serving as a currently selected item displayed in the input switching menu, the control circuitry hides an active display screen corresponding to the active item.

6. The display controller according to claim 5, wherein:
the first operation includes an operation on an up key of arrow buttons provided in a remote control; and
the second operation includes an operation on a down key of the arrow buttons.

7. The display controller according to claim 4, wherein:
the menu screen includes a control menu that displays one or a plurality of control items to each of which a function for controlling an active display screen corresponding to an active item serving as a currently selected item is assigned; and in a case where a desired control item is selected from the one or plurality of control items displayed in the control menu, the control circuitry controls the active display screen in accordance with a function assigned to the selected control item.

8. The display controller according to claim 7, wherein the function includes at least one of a function of causing the active display screen to transition to one screen, a function of changing the active display screen to be operated, a function of enlarging or reducing a size of the active display screen, or a function of changing a volume in accordance with the active display screen.

9. The display controller according to claim 1, wherein in a case where a plurality of pairs of the active items and the active display screens exists, the control circuitry performs display so that a positional relationship between each active item and the corresponding active display screen is identifiable.

10. The display controller according to claim 9, wherein the control circuitry displays association information in which each active item and the corresponding active display screen are associated with each other.

11. The display controller according to claim 9, wherein in a case where the active item goes off a screen, the control circuitry displays at least a part of the active item on the screen.

12. The display controller according to claim 1, wherein:
the user operation includes an operation corresponding to a common function related to the entire device and an operation corresponding to a unique function related to the active display screen; and
the control circuitry controls the active display screen in a case where the operation corresponding to the unique function is performed.

13. The display controller according to claim 1, wherein the user operation includes an operation on arrow buttons provided in a remote control.

14. The display controller according to claim 1, wherein the display screen displays an image of content.

15. The display controller according to claim 1, wherein:
the active display screen displays an image of first content; and
the selected display screen displays an image of second content different from the first content.

16. The display controller according to claim 14, wherein:
the content includes broadcast content; and
the display control device serves as a television receiver further including a display that displays the image of the content and a speaker that outputs a sound of the content.

17. A display control method comprising
causing a display controller to operate control circuitry configured to:
    display a plurality of items associated with a display screen, and
    in a case where a desired item is selected by a user operation from the plurality of displayed items, display a selected display screen corresponding to the selected item together with the display screen that is currently displayed, the selected display screen being displayed at a position relative to a display position of the selected item,
wherein
    in a case where the selected item is displayed in a left region of the active item, the control circuitry displays the selected display screen in a region corresponding to the left region and displays the active display screen in a region corresponding to a right region with respect to the left region, and
    in a case where the selected item is displayed in a right region of the active item, the control circuitry displays the selected display screen in a region corresponding to the right region and displays the active display screen in a region corresponding to a left region with respect to the right region.

* * * * *